(12) United States Patent
Shapira

(10) Patent No.: US 7,425,693 B2
(45) Date of Patent: Sep. 16, 2008

(54) SPECTRAL TRACKING

(75) Inventor: Ruth Shapira, Haifa (IL)

(73) Assignee: Rafael Advanced Defence Systems Ltd., Haifa (IL)

( * ) Notice: Subject to any disclaimer, the term of this patent is extended or adjusted under 35 U.S.C. 154(b) by 248 days.

(21) Appl. No.: 10/565,196

(22) PCT Filed: Jul. 18, 2004

(86) PCT No.: PCT/IL2004/000650

§ 371 (c)(1),
(2), (4) Date: Jan. 20, 2006

(87) PCT Pub. No.: WO2005/010547

PCT Pub. Date: Feb. 3, 2005

(65) Prior Publication Data

US 2007/0080851 A1  Apr. 12, 2007

(30) Foreign Application Priority Data

Jul. 24, 2003  (IL) .................................. 157098

(51) Int. Cl.
*G01S 13/72* (2006.01)
*G01S 13/66* (2006.01)
*G01S 13/00* (2006.01)
*F41G 7/00* (2006.01)

(52) U.S. Cl. ............. 244/3.1; 244/3.15; 244/3.16; 244/3.17; 89/1.11; 382/100; 382/103; 342/52; 342/53; 342/54; 342/55; 342/61; 342/62; 342/63; 342/67; 342/89; 342/94; 342/95; 342/97; 342/175; 342/189; 342/195; 342/196

(58) Field of Classification Search ........... 244/3.1–3.3; 89/1.11; 342/52–59, 61–66, 73–81, 175, 342/192–197, 67, 89–103, 189; 382/100, 382/103

See application file for complete search history.

(56) References Cited

U.S. PATENT DOCUMENTS

| | | | | | |
|---|---|---|---|---|---|
| 3,416,752 | A | * | 12/1968 | Hembree | 244/3.17 |
| 3,943,277 | A | * | 3/1976 | Everly et al. | 244/3.17 |
| 3,986,682 | A | * | 10/1976 | Dryden | 244/3.17 |
| 4,106,726 | A | * | 8/1978 | Emmons et al. | 244/3.17 |
| 4,133,004 | A | * | 1/1979 | Fitts | 244/3.16 |
| 4,162,775 | A | * | 7/1979 | Voles | 244/3.17 |

(Continued)

OTHER PUBLICATIONS

A. Kenton et al, "Joint Spectral Region Buried Land Mine Discrimination Performance," In Detection and Remediation Technologies for Mines and Minelike Targets V, vol. 4038 pp. 210-219 (Apr. 2000).

(Continued)

*Primary Examiner*—Bernarr E Gregory
(74) *Attorney, Agent, or Firm*—Mark M. Friedman

(57) ABSTRACT

A method of tracking a target. The method includes the steps of acquiring a first spectral image of a scene that includes the target, designating a spectral reference window, in the first spectral image, that includes a respective plurality of pixel vectors, acquiring a second spectral image, of the scene, that includes a respective plurality of pixel vectors, and hypercorrelating the spectral reference window with the second spectral image, thereby obtaining a hypercorrelation function, a maximum of the hypercorrelation function then corresponding to a location of the target in the scene.

18 Claims, 20 Drawing Sheets

U.S. PATENT DOCUMENTS

| | | | | |
|---|---|---|---|---|
| 5,341,142 | A | * | 8/1994 | Reis et al. .................... 342/64 |
| 5,564,650 | A | * | 10/1996 | Tucker et al. ............... 244/3.17 |
| 5,626,311 | A | * | 5/1997 | Smith et al. ................ 244/3.16 |
| 5,947,413 | A | * | 9/1999 | Mahalanobis .............. 244/3.17 |

OTHER PUBLICATIONS

S. Kumar et al, "Best-Bases Feature Extraction Algorithms for Classification of Hyper- spectral Data," IEEE Transactions On GeoScience and Remote Sensing, vol. 39 No. 7 pp. 1368-1379, Jul. 2001.

Studies of "Optics" book by H. Hecht, Addison Wesley, Third Edition p. 77 and p. 596 and Table on p. 74.

Charles L. Bennett "LIFTRIS, The Livermore Imagery FTIR Spectrometer" Fourier Transform Spectroscopy: 11th International Conference, edited by J.A. Haseth, American Institute of Physics Conference Proceedings 430, 1998, pp. 170-186.

* cited by examiner normalized correlation of (i,j) layers

600nm−>612nm

715nm−>727nm normalized correlation of (i,j) layers

600nm->612nm

715nm->727nm normalized correlation of (i,j) layers

600nm->612nm

715nm->727nm

SPECTRAL TRACKING

FIELD AND BACKGROUND OF THE INVENTION

The present invention relates to a method and system for tracking a target and, more particularly, to such a method and system that uses spectral images of a scene including the target in order to track the target.

FIG. 1 shows a battlefield scene including an enemy tank 10 and three trees 12. FIG. 2 is a schematic diagram of a prior art system that includes an unmanned aircraft 20 that may be, for example, a surveillance drone that is used by an operator 14 to locate and track tank 10, or alternatively a guided missile that is guided by operator 14 towards tank 10 to destroy tank 10. Aircraft 20 includes an imaging mechanism 22, such as a video camera, for acquiring digital images of the scene of FIG. 1, and a processor 24 for designating and tracking image pixels that correspond to tank 10, as described below. (Aircraft 20 also includes other components, such as a navigation system for determining the location of aircraft 20 and a communication system for relaying the digital images to operator 14 via a wireless communication channel 18 and for relaying commands from operator 14 to aircraft 20. These other components, not being germane to the present invention, are not shown in FIG. 2.) The images acquired by imaging mechanism 22 are panchromatic: each image is a rectangular array of pixels, with each pixel being a numerical representation of a value of a corresponding intensity of light received by imaging mechanism 22, in a single wide or narrow spectral band, from a corresponding point in the field of view of imaging mechanism 22.

Aircraft 20 transmits the images acquired by imaging mechanism 22 to a console 16 that is used by operator 14 to operate aircraft 20. These images are displayed on a video terminal that forms part of console 16. When operator 14 sees an image that includes pixels corresponding to tank 10, operator 14 designates those pixels, using a conventional mechanism such as a mouse to pick the image coordinates of one or more pixels that correspond to tank 10. These coordinates are transmitted to aircraft 20 via communication channel 18. In the subsequent discussion, the image in which operator 14 designates the pixels corresponding to tank 10 is called the "first" image, because this is the image that guides subsequent processing by processor 24. Because drone 20 is moving relative to tank 10, whether or not tank 10 itself is moving, the pixels corresponding to tank 10 in subsequent images are not, in general, the same pixels as the pixels corresponding to tank 10 in the first image. Therefore, processor 24 uses a cross-correlation technique to identify pixels corresponding to tank 10 in subsequent images.

FIG. 3 shows a panchromatic image 30 and a reference window 32 within image 30. Image 30 is an I×J rectangular array of pixels that are indexed by indices i and j, i∈[1,I], j∈[1,J]. With each pixel is associated a respective intensity value. Window 32 is a H×K rectangular subset of the pixels of image 30 that includes the pixels corresponding to the target. Typically, I and J are powers of 2, such as 512 or 1024, and H and K are small odd integers, such as 5 or 7.

Processor 24 constructs reference window 32, in the first image 30, that is centered on the image coordinates picked by operator 14 as corresponding to tank 10. Processor 24 then cross-correlates reference window 32 with the next image 30 by constructing a correlation function Corr(i,j). The argument of this correlation function is a pair of pixel indices (i,j). For each pixel (i,j) in the next image 30 for which reference window 32 can be centered on that pixel while still being contained within image 30 (i.e., for all the pixels except for a margin $\lfloor H/2 \rfloor$ pixels wide at the top and bottom of image 30 and $\lfloor K/2 \rfloor$ pixels wide on the left and right of image 30), Corr(i,j) is defined as:

$$Corr(i,j) = \frac{\sum_{h=1:H, k=1:K} x_{h,k} y_{i-\lfloor H/2 \rfloor -1+h, j-\lfloor K/2 \rfloor -1+k}}{\sqrt{\sum_{h=1:H, k=1:K} x_{h,k}^2 \sum_{h=1:H, k=1:K} y_{i-\lfloor H/2 \rfloor -1+h, j-\lfloor K/2 \rfloor -1+k}^2}} \quad (1)$$

where $x_{h,k}$ is the intensity of the (h,k) pixel of reference window 32, $y_{h,k}$ is the intensity of the (h,k) pixel of image 30, and, for a real number a, the notation $\lfloor a \rfloor$ represents the largest integer that is less than or equal to a. (Note that the correlation function Corr is called "C" in the "Proof of Concept" section below.) With the indicated normalization, and given that all intensities $x_{k,l}$ and $y_{k,l}$ are non-negative, Corr(i,j) can take on values only in the interval [0,1].

Alternatively, and preferably, Corr(i,j) is defined as:

$$Corr(i,j) = \frac{\sum_{h=1:H, k=1:K} (x_{h,k} - \bar{x})(y_{i-\lfloor H/2 \rfloor -1+h, j-\lfloor K/2 \rfloor -1+k} - \bar{y})}{\sqrt{\sum_{h=1:H, k=1:K} (x_{h,k} - \bar{x})^2 \sum_{h=1:H, k=1:K} (y_{i-\lfloor H/2 \rfloor -1+h, j-\lfloor K/2 \rfloor -1+k} - \bar{y})^2}} \quad (2)$$

where $\vec{x}$ is all average of $x_{h,k}$, either over image 30 or, alternatively, over a suitable portion of image 30, such as reference window 32 itself, and similarly for $y_{h,k}$. Corr(i,j), as defined in equation (2), can take on values in the interval [−1,1]

Ideally, Corr(i,j) would be equal to 1 when window 32 is centered on the pixels of image 30 that correspond to the target, and less than 1 elsewhere. This is almost never the case, for a variety of reasons. Among these reasons are noise in image 30 and window 32, and the fact that if image 30 is not the source image of window 32, then image 30 almost always is acquired from a different point of view, relative to the scene and the target than the source image of window 32, because of movement of both drone 20 and the target relative to the scene. Therefore, the location of the pixels of the next image 30 that correspond to the target is taken to be the set of pixels centered on the pixel (i,j) for which Corr(i,j) is maximized. Only pixels (i,j) for which Corr(i,j) exceeds an adaptively determined threshold are considered. Furthermore, to avoid false positives, only a portion of the next image 30 in which the target is likely to be found a priori is considered.

This cross-correlation procedure is repeated for subsequent images 30, to track the target in subsequent images 30. As needed, reference window 32 is replaced with a new reference window based on the pixels corresponding to the target in the most recently acquired image 30.

Recently, a new technology, whose most notable application to date has been in remote sensing, has matured. In this new technology, a scene is imaged in several spectral bands. Such imaging is known generally as "spectral imaging". If a small number (fifteen or fewer) of relatively broad spectral bands (for example, red, green and blue bands) are used, this technique is referred to as "multispectral imaging". If a large number of relatively narrow bands are used, this technique is referred to as "hyperspectral imaging". The first table (unnumbered) in the "Proof of Concept" section below lists a typical example of 19 adjacent spectral bands that span wavelengths from 435.3 nanometers (blue) to 891.1 nanometers (near IR). The "spectral images" acquired by spectral imaging are three dimensional arrays of intensity values, with each intensity value corresponding to the intensity of one scene pixel in one of the imaged bands. FIG. 4 shows a spectral image 40 that consists of L I×J spectral layers 42. Three spectral layers 42 are shown explicitly. The presence of the remaining spectral layers 42 is indicated by ellipses ( . . . ). Each spectral layer 42 is a panchromatic image in its own right. Thus, spectral image 40 is a parallelepiped array of pixels indexed by three indices i, j and l, with i∈[1,I], j∈[1,J] and l∈[1,L]. Each vertical column of spectral image 40, i e., the set of pixel intensities indexed by a particular index pair (i,j) for all values of l in [1,L], is referred to herein as a "pixel vector".

Obviously, spectral image 40 includes more information than any of its component spectral layers 42, either considered in isolation or summed along the wavelength (l) axis to form a single wide-band panchromatic image. There is thus a widely recognized need for, and it would be highly advantageous to have, a method of tracking a target that is based on spectral images such as image 40, rather than on panchromatic images such as image 30.

SUMMARY OF THE INVENTION

According to the present invention there is provided a method of tracking a target, including the steps of: (a) acquiring a first spectral image of a scene that includes the target; (b) designating a spectral reference window, in the first spectral image, that includes a respective plurality of pixel vectors; (c) acquiring a second spectral image, of the scene, that includes a respective plurality of pixel vectors; and (d) hypercorrelating the spectral reference window with the second spectral image, thereby obtaining a hypercorrelation function, a maximum of the hypercorrelation function then corresponding to a location of the target in the scene.

According to the present invention there is provided a method of tracking a target, including the steps of: (a) acquiring a first spectral image of a scene that includes the target; (b) designating a spectral reference window in the first spectral image; (c) acquiring a second spectral image of the scene; (d) hypercorrelating the spectral reference window with the second spectral image, thereby obtaining a hypercorrelation function, a maximum of the hypercorrelation function then corresponding to a location of the target in the scene; (e) acquiring a first panchromatic image of the scene; (f) designating a panchromatic reference window in the first panchromatic image; (g) acquiring a second panchromatic image of the scene; (h) correlating the panchromatic reference window with the second panchromatic image, thereby obtaining a correlation function; and (i) combining the hypercorrelation function with the correlation function to obtain a joint correlation function, a maximum of the joint correlation function then corresponding to a location of the target in the scene.

According to the present invention there is provided a method of tracking a target, including the steps of: (a) acquiring a first spectral image of a scene that includes the target; (b) designating a spectral reference window in the first spectral image; (c) acquiring a second spectral image of the scene; and (d) hypercorrelating the spectral reference window with the second spectral image, thereby obtaining a hypercorrelation function, a maximum of the hypercorrelation function then corresponding to a location of the target in the scene; wherein each spectral image includes: (a) a first spectral band including only wavelengths below about 720 nanometers and above about 605 nanometers; (b) a second spectral band including only wavelengths above about 720 nanometers; and (c) a third spectral band including only wavelengths below about 605 nanometers.

According to the present invention there is provided a system for tracking a target, including: (a) a spectral imager for acquiring first and second spectral images of a scene that includes the target; (b) a mechanism for designating a spectral reference window, in the first spectral image, that includes a respective plurality of pixel vectors and (c) a processor for hypercorrelating the spectral reference window with the second spectral image, thereby obtaining a hypercorrelation function, a maximum whereof corresponds to a location of the target in the scene.

According to the present invention there is provided a system for tracking a target, including: (a) a spectral imager for acquiring first and second spectral images of a scene that includes the target; (b) a panchromatic imaging mechanism for acquiring first and second panchromatic images of the scene; (c) a mechanism for designating a spectral reference window in the first spectral image; (d) a mechanism for designating a panchromatic reference window in the first panchromatic image; and (e) a processor for: (i) hypercorrelating the spectral reference window with the second spectral image, thereby obtaining a hypercorrelation function, (ii) correlating the panchromatic reference window with the second panchromatic image, thereby obtaining a correlation function, and (iii) combining the hypercorrelation function with the correlation function to obtain a joint correlation function, a maximum whereof corresponds to a location of the target in the scene.

According to the present invention there is provided a system for tracking a target, including: (a) a spectral imager for acquiring first and second spectral images of a scene that includes the target, each spectral image including: (i) a first spectral band including only wavelengths below about 720 nanometers and above about 605 nanometers, (ii) a second spectral band including only wavelengths above about 720 nanometers, and (iii) a third spectral band including only wavelengths below about 605 nanometers; (b) a mechanism for designating a spectral reference window in the first spectral image; and (c) a processor for hypercorrelating the spectral reference window with the second spectral image, thereby obtaining a hypercorrelation function, a maximum whereof corresponds to a location of the target in the scene.

The term "target", as used herein, refers both to man-made structures, whether mobile or immobile, such as tank 10, and to other distinguishable features of the scene, such as terrain features that may be used to orient the navigational system of an unmanned aircraft such as aircraft 20.

The essence of the present invention is to generalize Corr (i,j), as defined in equations (1) and (2), by defining a "hypercorrelation" between a reference window, derived from a first spectral image, and a second spectral image. This hypercorrelation takes into account the presence, at each index pair (i,j) of a spectral image, information from more than one spectral band. The preferred hypercorrelation is obtained by replacing the intensities x and y of equations (1) and (2), and their products, with the corresponding pixel vectors and their inner products. Most preferably, the pixel vectors are shifted, by common offset vectors, prior to taking the inner products. The preferred common offset vectors are averages, either of all the pixel vectors in the spectral images or over suitable subsets of the pixel vectors in the spectral images.

The resulting hypercorrelation function is used in the same way as the prior art correlation function to track the target: the location of the pixel vectors that correspond to the target is taken to be the set of pixel vectors centered on the pixel vector (i,j) for which the hypercorrelation function is maximized.

Preferably, along with the spectral images, corresponding panchromatic images of the scene are acquired, either independently of the spectral images (albeit simultaneously with the acquisition of the spectral images) or by "stacking" the spectral images. ("Stacking" a spectral image means summing the spectral layers thereof along the wavelength axis.) A joint correlation function is constructed by combining the prior art correlation function, obtained from the panchromatic images, with the hypercorrelation function, preferably by selecting, at each pixel of a panchromatic image and at each corresponding pixel vector of the corresponding spectral image, the smaller of the corresponding correlation and hypercorrelation values. Subsequent processing is applied to the joint correlation function rather than to the hypercorrelation function.

Because of the limited computational power typically available to a real time weapon or surveillance system such as aircraft 20, and because of the relatively high cost of spectral imaging sensors, it is preferable to use only two or three relatively wide adjacent spectral bands. If two bands are used, the preferred wavelength boundary between the two bands is about 720 nanometers. If three bands are used, the preferred wavelength boundaries are at about 605 and 720 nanometers.

A system of the present invention is similar to the prior art system of FIG. 2, with imaging mechanism 22 replaced with an appropriate spectral imager, and with processor 24 replaced with a processor that implements the algorithms of the present invention.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and system for tracking a target in successive spectral images of a scene. Specifically, the present invention can be used to track a battlefield target.

The principles and operation of spectral tracking according to the present invention may be better understood with reference to the drawings and the accompanying description.

Figure 1:
FIG. 1 shows a battlefield scene.
Figure 1:
Figure 1:
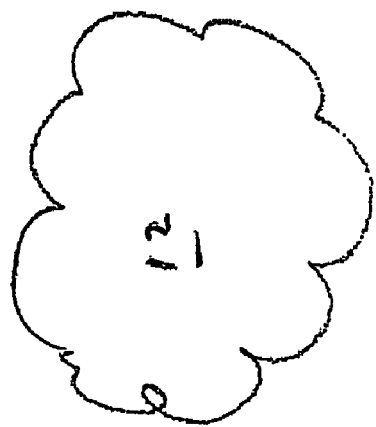
Figure 1:
Figure 2:
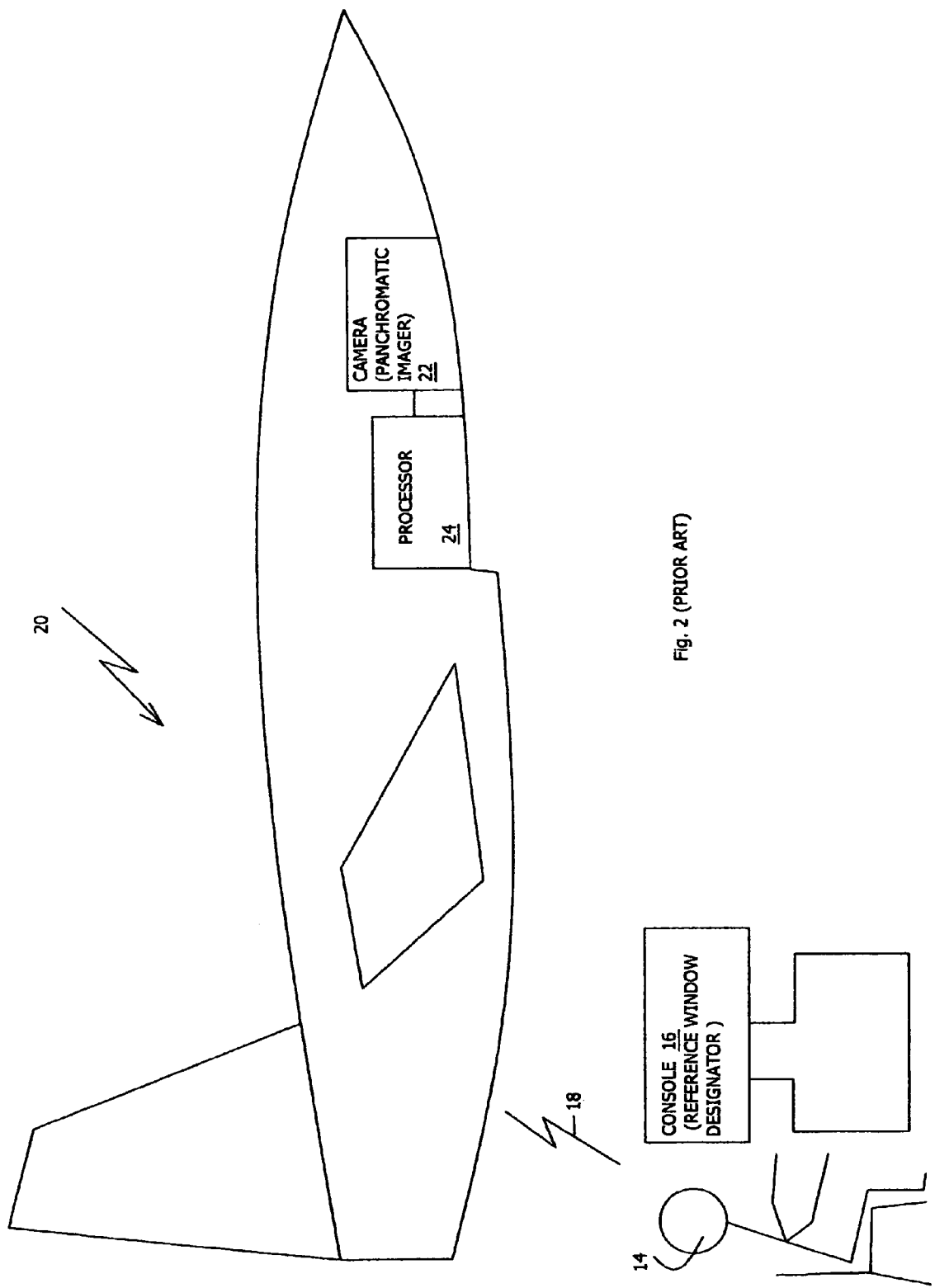
FIG. 2 is a schematic depiction of a prior art system of which the present invention is an improvement.
Figure 3:
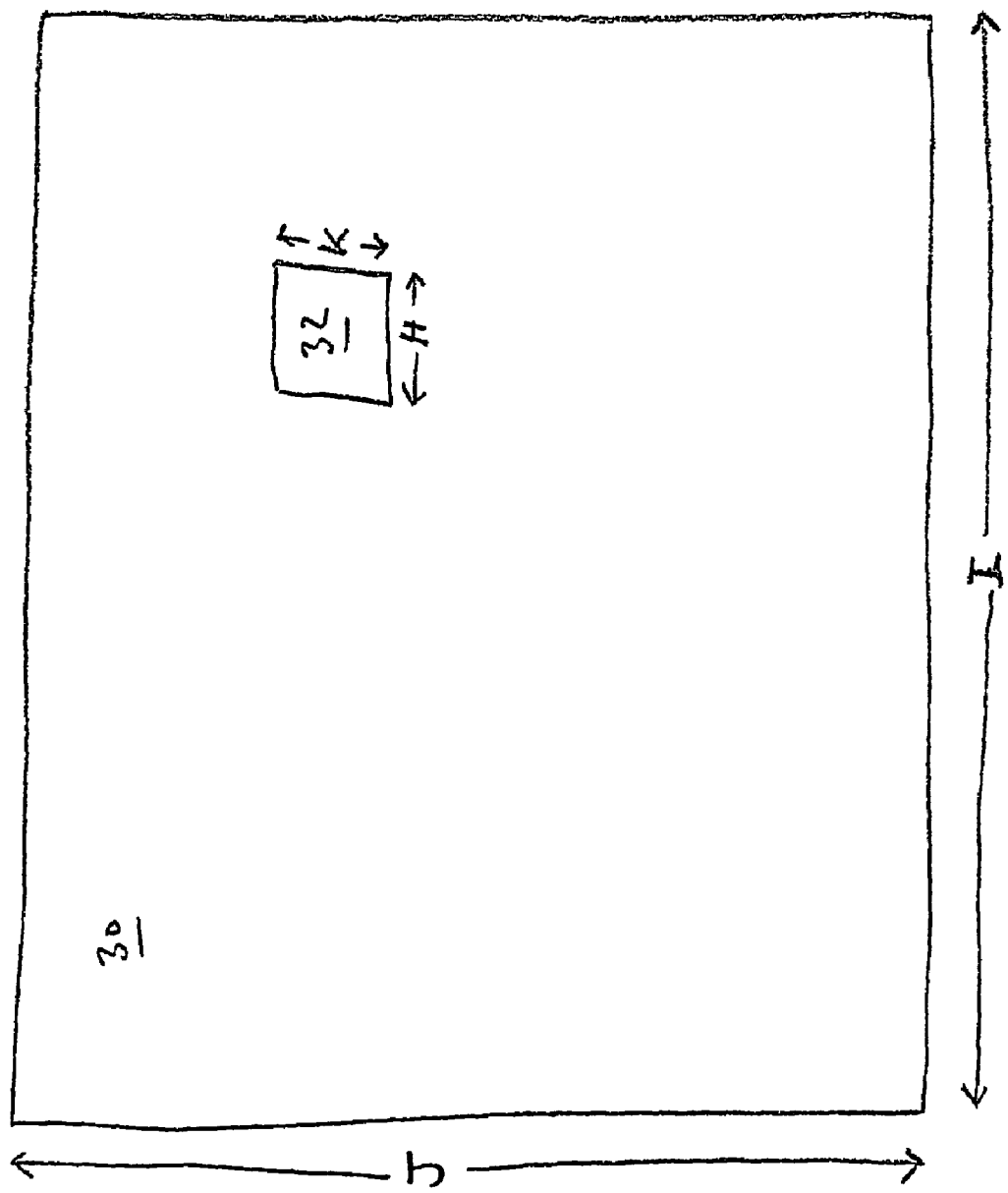
FIG. 3 shows a panchromatic image with a reference window.
Figure 4:
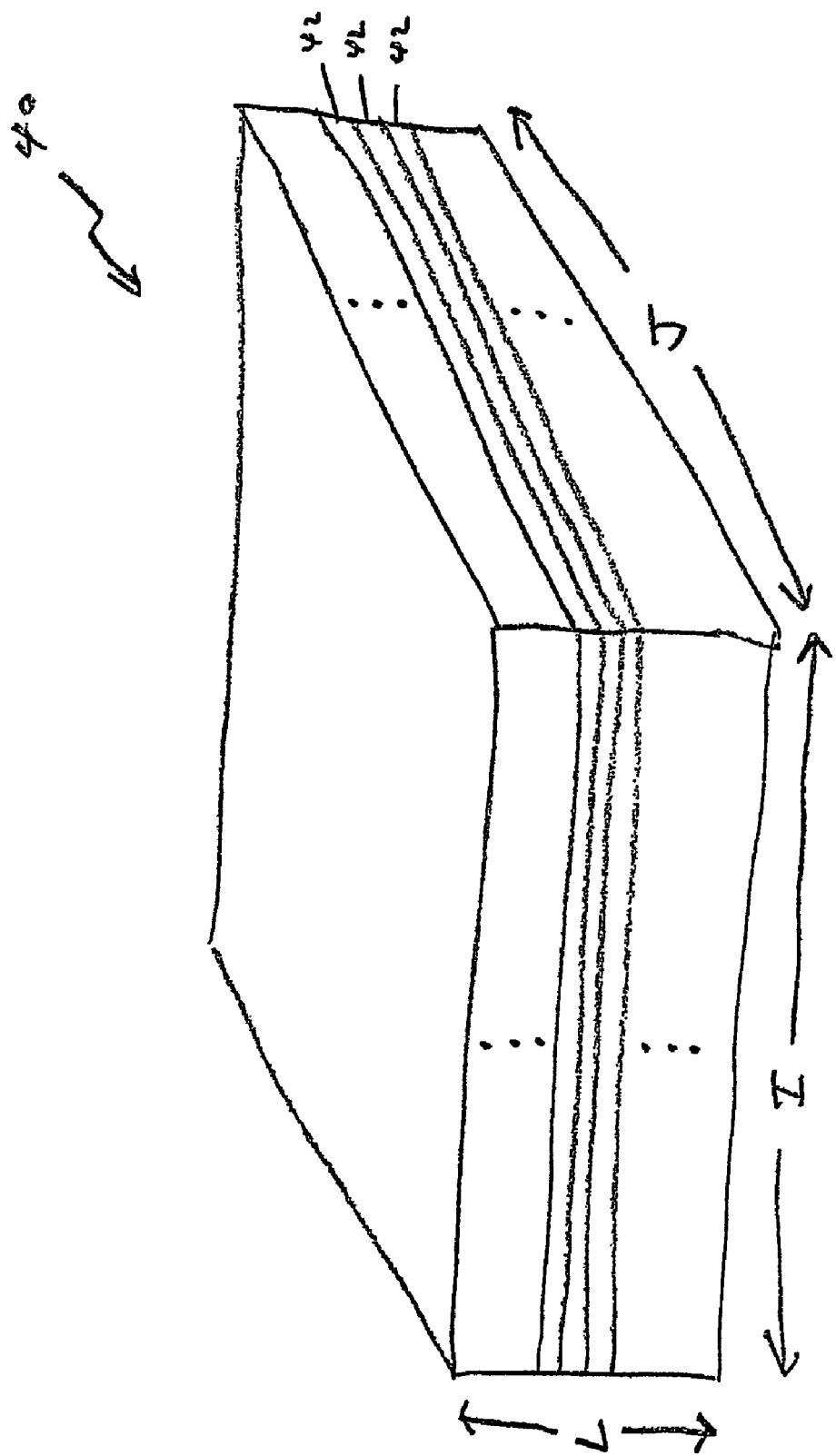
FIG. 4 shows a spectral image.
Figure 5:
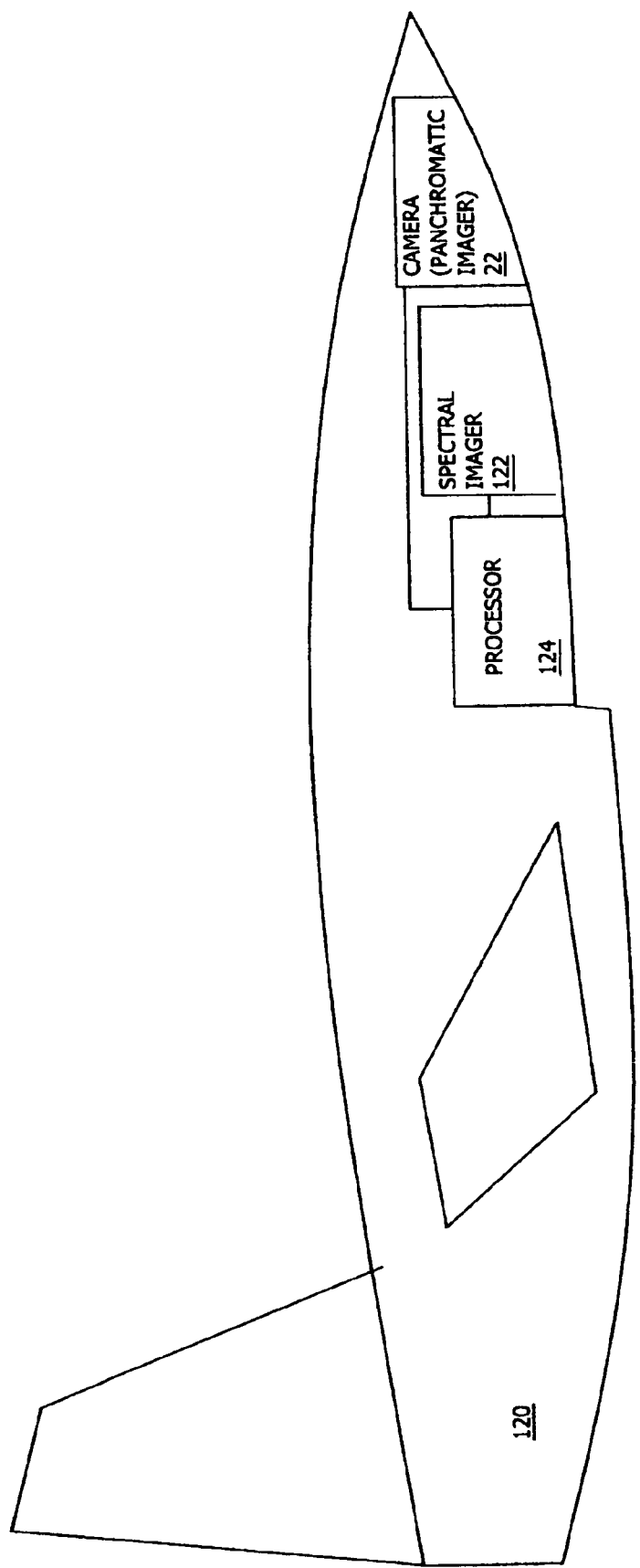
FIG. 5 is a schematic depiction of an unmanned aircraft of the present invention.

Referring again to the drawings, FIG. 5 is a schematic diagram of an unmanned aircraft 120 of the present invention. Aircraft 120 is identical to aircraft 20, except for the inclusion of a spectral imager 122, along with panchromatic imaging mechanism 22, for acquiring spectral images 40 of the scene, and except for the substitution of a processor 124 of the present invention for prior art processor 24. Processor 124 implements the algorithms of the present invention in conjunction with the appropriate prior art tracking algorithms, as described below. It should be noted that the inclusion of both imaging mechanism 22 and spectral imager 122 in drone 120 is optional. The present invention is described below initially with respect to the use of only spectral images 40 acquired by spectral imager 122, and then with respect to the use of these spectral images together with panchromatic images 30 acquired by imaging mechanism 22.

As aircraft 120 flies above the battlefield, processor 124 uses spectral imager 122 to acquire spectral images 40 of the battlefield. Aircraft 120 transmits spectral images 40 acquired by imaging mechanism 122 to console 16. Panchromatic images that are formed by stacking spectral images 40, i.e., by summing spectral images 40 along the wavelength axes thereof, are displayed on the video terminal of console 16. When operator 14 sees a panchromatic image that includes summed pixel vectors corresponding to tank 10, operator 14 designates those pixel vectors, using a conventional mechanism such as a mouse to pick the panchromatic image indices (i,j) that correspond to tank 10. These indices are transmitted to aircraft 120 via communication channel 18. According to the present invention, a reference window, analogous to window 32, is defined in the first spectral image 40 that contains pixel vectors corresponding to the target. This spectral image 40 is referred to herein alternatively as the "first" spectral image 40 and as the "reference" spectral image 40. The reference window that is defined in the first spectral image 40 is an H×K rectangular array of pixel vectors centered on the pixel vectors corresponding to the target. Processor 124 hypercorrelates this reference window with the next spectral image 40 by constructing a hypercorrelation function Hyper (i,j). (Note that the hypercorrelation function Hyper is called "H" in the "Proof of Concept" section below.) The argument of this hypercorrelation function is a pair of pixel vector indices (i,j). For each pixel vector (i,j) in the next spectral image 40 for which the reference window can be centered on that pixel vector while still being contained within the next spectral image 40, Hyper(i,j) is defined as:

$$\text{Hyper}(i,j) = \frac{1}{HK} \sum_{h=1:H, k=1:K} \frac{<\vec{x}_{h,k}, \vec{y}_{i-\lfloor H/2 \rfloor - 1 + h, j - \lfloor K/2 \rfloor - 1 + k}>}{\|\vec{x}_{h,k}\| \|\vec{y}_{i-\lfloor H/2 \rfloor - 1 + h, j - \lfloor K/2 \rfloor - 1 + k}\|} \quad (3)$$

where $\vec{x}_{h,k}$ is the (h,k) pixel vector of the reference window, i.e., a vector of L pixel intensities $x_{h,k,l}$, $l \in [1,L]$; $\vec{y}_{h,k}$ is the (h,k) pixel vector of the next spectral image 40, i.e., a vector of L pixel intensities $y_{h,k,l}$, $l \in [1,L]$; the notation $<\vec{a}, \vec{b}>$ represents the inner product of two vectors $\vec{a}$ and $\vec{b}$; and the notation $\|\vec{a}\|$ represents the Euclidean norm of a vector $\vec{a}$. In other words, Hyper (i,j) is an average of normalized inner products of pixel vectors of the reference window and corresponding pixel vectors of the next spectral image 40, with the normalization factors being products of the Euclidean norms of the relevant pixel vectors.

The location of the pixel vectors of the next spectral image 40 that correspond to the target is taken to be the set of pixel vectors centered on the pixel vector (i,j) for which Hyper(i,j) is maximized. Only pixels (i,j) for which Hyper(i,j) exceeds an adaptively determined threshold are considered. To avoid false positives, only a portion of the next spectral image 40 in which the target is likely to be found a priori is considered. This hypercorrelation procedure is repeated for subsequent spectral images 40 to track the target in subsequent spectral images 40.

Hyper(ij), as defined in equation (3), has been found to give results, when used with spectral images 40, that are only marginally better than the results obtained using Corr(i,i) with panchromatic images 30. As discussed in the "Proof of Concept" section below, the reason for this is that all the intensities $x_{i,j,l}$ are positive, so that all the pixel vectors $\vec{x}_{i,j}$ tend to be parallel. Therefore, instead of using raw pixel vectors in the right hand side of equation (3), shifted pixel vectors are used, to force the pixel vectors to point in disparate directions. The pixel vectors of the reference window are shifted by subtracting therefrom a common offset vector $\vec{x}_{off}$ and the pixel vectors of the next spectral image 40 are shifted by subtracting therefrom a common offset vector $\vec{y}_{off}$. One preferred common offset vector, that is subtracted from the pixel vectors of the reference window, is an average of all the pixel vectors of the reference spectral image 40:

$$\vec{x}_{off} = \frac{1}{IJ} \sum_{h=1:I, k=1:J} \vec{x}_{h,k} \qquad (4)$$

Another preferred common offset vector, that is subtracted from the pixel vectors of the reference window, is an average over a suitable subset of the pixel vectors of the reference spectral image 40, for example an average over only the pixel vectors of the reference window itself. One preferred common offset vector, that is subtracted from the pixel vectors of the next spectral image 40, is an average of all the pixel vectors of the next spectral image 40:

$$\vec{y}_{off} = \frac{1}{IJ} \sum_{h=1:I, k=1:J} \vec{y}_{h,k} \qquad (5)$$

Another preferred common offset vector, that is subtracted from the pixel vectors of the next spectral image 40, is an average over a suitable subset of the pixel vectors of the next spectral image 40. The resulting hypercorrelation function is:

$$\text{Hyper}(i,j) = \qquad (6)$$

$$\frac{1}{HK} \sum_{h=1:H, k=1:K} \frac{<\vec{x}_{h,k} - \vec{x}_{off}, \vec{y}_{i-\lfloor H/2 \rfloor - 1 + h, j - \lfloor K/2 \rfloor - 1 + k} - \vec{y}_{off}>}{\|\vec{x}_{h,k} - \vec{x}_{off}\| \|\vec{y}_{i-\lfloor H/2 \rfloor - 1 + h, j - \lfloor K/2 \rfloor - 1 + k} - \vec{y}_{off}\|}$$

In one variant of this procedure, for each pixel vector $\vec{y}_{i,j}$, the common offset vector that is subtracted from the pixel vectors of the associated H×K window is an average over only the pixel vectors of the associated H×K window. "$\vec{y}_{off}$" in equation (6) then becomes a function of i and j.

Still better results are obtained by acquiring both panchromatic images 30 and spectral images 40 of the scene, and combining Corr(i,j) and Hyper(i,j) in a joint correlation function Joint(i,j) that exploits both the sensitivity of Corr(i,j) to the intensities of the target pixels and the sensitivity of Hyper (i,j) to the spectral signature of the target. (Note that the joint correlation function Joint is called "JHC" in the "Proof of Concept" section below.) The preferred joint correlation function is a pixel-by-pixel minimum of Corr(i,j) and Hyper (i,j):

$$\text{Joint}(i,j) = \min[\text{Corr}(i,j), \text{Hyper}(i,j)] \qquad (7)$$

The preferred Corr(i,j) is Corr(i,j) of equation (2). Panchromatic images 30 are acquired separately from spectral images 40, using panchromatic imaging mechanism 22 simultaneously with spectral imager 122, as described above. Alternatively, only spectral imager 122 is used, and panchromatic images 30 are synthesized from spectral images 40 by summing spectral images 40 along the wavelength axes thereof. If the intensity components of a pixel vector $\vec{x}_{i,j}$ of a spectral image 40 are $x_{i,j,l}$, then the intensity of the corresponding synthetic panchromatic image 30 is $$x_{i,j} = \sum_{l=1:L} x_{i,j,l}.$$

By analogy to the corresponding operation in exploration geophysics, this summation is referred to herein as "stacking" spectral image 40.

Because of the limited weight and electrical power allowed to the on-board systems of an airborne platform such as drone 120, and because of the high cost of hyperspectral sensors, it is preferable to use fewer spectral bands in the present invention than in conventional hyperspectral imaging. Although spectral layers 42 of a scene that are acquired in adjacent spectral bands are usually expected to be similar, it has been found empirically that for many terrains of interest, there is a relatively sharp break in the spectral character of the scenes at around 720 nanometers. Similar sharp breaks have been reported in the literature. See, for example, A. Kenton et al., "Joint spectral region buried land mine discrimination performance", *Proceedings of the SPIE on Detection and Remediation Technologies for Mines and Minelike Targets V*, vol. 4038 pp. 210-219 (April 2000). See also, for example, S. Kumar et al., "Best-bases feature extraction algorithms for classification of hyperspectral data", *IEEE Transactions on Geoscience and Remote Sensing*, vol. 39 no. 7 pp. 1368-1379. The Kenton et al. paper is in a non-imaging context. Kumar et al. noted such breaks in an imaging context; but their focus was on a postiori decomposition of hyperspectral images into basis sets for landcover discrimination, and they apparently did not notice the utility of the breaks for the a priori merger of hyperspectral bands in data acquisition. As described in the "Proof of Concept" section below, another, less pronounced break in the spectral character of these scenes has been found at about 605 nanometers. Therefore, spectral images 40 of the present invention preferably include only two or three spectral bands. A preferred example of two spectral bands is a first wide band from 435 nanometers to 705 nanometers and a second wide band from 755 nanometers to 885 nanometers. A preferred example of three spectral bands is a first band from 430 nanometers to 605 nanometers, a second band from 605 nanometers to 720 nanometers and a third band from 720 nanometers to 975 nanometers.

Proof of Concept

This report summarizes a study whose objective was to examine the possibility of exploiting the additional dimension provided by Hyper-spectral Sensing in order to attain an improvement in the performance of the classical algorithms in computer vision. In particular, the study attends to matching and tracking mechanisms that are based on correlation methods. During the study, the behavior of spectral data, its particularities and the ways in which it can be optimally utilized are analyzed. New concepts of three-dimensional correlation are defined, and through these, the tracking of three-dimensional data. For this purpose, a new mathematical expression is specified, an hyper-correlation, that uses spectral information together with spatial information in order to obtain an index that reflects the correlation between two data cubes. The report presents the results attained by computer processing of real data photographed by a hyper-spectral sensor. The results show that the spectral dimension adds a most important contribution to performance.

Later on, the report presents various possibilities to reduce the number of channels to a minimum of two channels. It shows that through a correct choice of channels, it is possible to reduce the damage caused to performance. Choosing channels by this reduction method takes into consideration their contribution as well as the ability to implement them with available and inexpensive sensors.

And finally, a third mechanism is defined, Combined Hyper-correlation which, by definition, offers better performance than the other two mechanisms. The results of applying the new mechanisms on two layered cube, for thirteen randomly chosen representative targets, show an improvement in performance equal to more than one order of magnitude when compared to classic two-dimensional correlation performance, in terms of false matching criteria for seven threshold values.

Due to the additional dimension, the two mechanisms defined in this study require a smaller number of pixels than are normally required in two-dimensional correlation, therefore tracking of relatively small targets, and under more difficult conditions, is made possible.

In addition to the improvement in point (target) tracking, Combined Hyper-correlation permits an improvement in area tracking. This is due to its capacity to reduce the number of false matches, to the chosen image windows ("correlation window"), for a given threshold. Another advantage derives from its ability to overcome difficulties that two-dimensional correlation techniques encounter in certain scenarios.

Due to the dramatic improvement in performance, and because of the possibility to implement algorithms through inexpensive sensors, this study opens the door to ample and most interesting opportunities that should be promptly put into use.

Table of Contents

Introduction

Principles of Two-dimensional Correlation Tracking

Definition of Three-Dimensional Spatial-Spectral Correlation

Comparison between the Performance of Two-dimensional Correlation and Three-dimensional Hyper-correlation in Actual Photos Definition of Improved Hyper-correlation Combining Spatial and Spectral Information Comparison Between the Performance of Improved Hyper-correlation and Improved Two-dimensional Correlation Differences in the Information found in the Various Spectral Channels Applying the Improved Hyper-correlation on Reduced Layers Cube The Reduced Solution: Narrow or Wide Spectral Bands?

Combined Hyper-correlation: Using the Advantages of Each Mechanism

Annex

Introduction

The spectral dimension added to the two spatial dimensions in hyper-spectral sensing adds information that should more uniquely define various areas of the picture relative to panchromatic sensing. This assumption was used as a basis for the study that is herein being reported. The objective of the study was to take advantage of the spectral axis information in order to expand known two-dimensional correlation methods and improve their performance through the definition of three-dimensional correlation methods, and to examine the efficacy of such expansion.

Spectral information mostly measures tens of layers/pictures, and because of that it weighs down the computation systems. In addition, it depends on sensors that are still very expensive and not sufficiently small. Therefore, a second objective of this study was to examine the possibilities of a limited use of the spectral information, of up to two or three channels, narrow or broad, through sifting or fusion, so that it may be attained from inexpensive off-the-shelf sensors, in such a way that it will still be possible to obtain a clear added value to the classic algorithms of computer vision.

Two-dimensional correlation methods are widespread in various computer vision systems, amongst them point (object) correlation trackers and area trackers. The presentation of a possible clear-cut improvement to these algorithms through inexpensive tools, as presented in this study, will allow for an increase in their performance possibilities and a response to problems that are considered difficult under the existing conditions.

Principle of Two-Dimensional Correlation Tracking

Correlation tracker, applied on sequential panchromatic images, is based on sampling in one image a window of interest of k×h pixels around the point we wish to track, the tracking window, and matching it to the right window in every consecutive image, using a correlation function. The maximal value in the correlation surface, generated by the correlation function over all the examined windows for all the examined points in the search area, indicates the place of the right match, given that this value is greater then a predetermined acceptance threshold.

One common correlation function is given in (1), resulting correlation surface values ranging from 0 to 1, where 1 indicates an absolute match. Another correlation function used frequently will result in values ranging from −1 to 1, as we shall later see.

$$C(m,n) = \Sigma_{i=1:k, j=1:h} X(i,j) * Y(\underline{m},\underline{n}) / (\Sigma_{i=1:k, j=1:h} X(i,j)^2 * \Sigma_{i=1:k, j=1:h} Y(\underline{m},\underline{n})^2)^{1/2} \quad (1)$$

where $C(m,n)$ is the correlation function value for pixel $(m,n)$ in the current image, $X(i,j)$ is the intensity value in pixel $(i,j)$ of the tracking window X, Y is the window around pixel $(m,n)$ in the current image, $Y(\underline{m},\underline{n})$ its intensity in $(\underline{m},\underline{n})$, $\underline{m} = m - [k/2+1] + i$; and $\underline{n} = n - [h/2+1] + j$;

and [g] stands for largest integer smaller than g.

The acceptance threshold value is automatically set in an adaptive manner, and depends on the information contained in the tracking window. The threshold determination mechanism takes into consideration different kind of noise sources, like spatial quantization—location of pixels, electronic noise, and the like, that will cause the correlation value at the matching point to be less than the theoretical value 1. The lowered threshold which permits the identification of the matching point even under noisy conditions, will cause false matching points whose number will increase as the search area increases. The search area is a function of the external dynamics of the system in which the tracker operates, and of the estimation function through which we attempt to reduce that area. However, situation may exist whereas a large search area may be required and this will increase the danger of false matches.

A possible way to allow larger search area, and at the same time to keep low the potential of false matches, is by making the tracking window contain more unique information, and by developing a technique that can exploit this uniqueness. Such unique information is engulfed in hyperspectral imaging.

Before explaining the technique we wish to establish criteria to judge its performance. A good sign of the success of the matching mechanisms will be the quantity of false matches on the entire original image. That is, the number of points over the acceptance threshold, on the full auto-correlation surface that is created by correlating the tracking window with the windows around all the points in the original image.

Definition of Three-Dimensional Spatial-Spectral Correlation

In hyperspectral sensing we exchange the panchromatic two-dimensional image for a data-cube. This cube is attained from imaging the same scene simultaneously in many contiguous narrow spectral bands, and symbolically stacking the images one on top of the other. This cube has two spatial axes, I and J, and a spectral axis S. Hence, for every spatial coordinates pair $(i,j)$, an L elements spectral vector is defined by the intensities in the $(i,j)$ pixels in all L stacked images—layers. This third dimension adds the information we hope to use in order to improve the uniqueness of the tracking window, which turns now to be a tracking cube, or a cube of interest, with dimension k×h×L pixels that were extracted from the data-cube.

Assuming an imager that generates repeatedly data-cubes of the observed scene, we wish to define a three dimensional correlation function, which takes into account simultaneously the spectral and spatial information existing in the tracking cube, to match it with the right sub cube in consecutive data-cubes. Such a correlation function, which we denote hyper-correlation, is given in (2), where the sum of products of intensities in (1) is replaced by the sum of inner products of the spectral vectors, normalized by their length.

$$H(m,n) = (1/k*h) * \Sigma_{i=1:k, j=1:h} (X'(i,j)/\|X(i,j)\|) * (Y(\underline{m},\underline{n})/\|Y(\underline{m},\underline{n})\|) \quad (2)$$

where $H(m,n)$ is the hyper-correlation function value for the spatial location $(m,n)$ in the current data-cube, $X(i,j)$ is the spectral vector in location $(i,j)$ of the tracking cube X, and the vector $X'(i,j)$ its transpose, Y is the sub cube around $(m,n)$ in the current data-cube, $Y(\underline{m},\underline{n})$ its spectral vector in location $(\underline{m},\underline{n})$, $\underline{m} = m - [k/2+1] + i$; and $\underline{n} = n - [h/2+1] + j$, $\|o\|$ is the norm of vector o, and [g] stands for largest integer smaller than g.

Applying the hyper-correlation function, as defined in (2), we perform a combined spatial-spectral correlation by calculating the cosine of the angle between every spectral vector in the cube of interest and the corresponding spectral vectors in the checked sub-cube, and averaging the results. The values of this hyper-correlation function will thus range between 0 and 1, where the value 1 indicates an absolute match.

When we hyper-correlate a cube of interest, extracted around a chosen point in a data-cube, with the consecutive data-cubes, to find a match, we perform a tracking in time of the chosen point. We anticipate that, as in the two dimensional case, the value of the hyper-correlation function at the matching location will be lower than 1, due to the various noises. Hence, here also it is necessary to determine an acceptance threshold, adaptively, and require that the value on the hyper-correlation surface, for a candidate location, exceeds this threshold, in order to be accepted as a possible matching point.

We must check to see if the inclusion of this additional spectral information in the correlation process did in fact bring about an improved performance, as seems logical.

Comparison Between the Performance of Two-Dimensional Correlation and Three-Dimensional Hyper-Correlation in Actual Images:

The database on which we performed the comparative test, between the correlation and hyper-correlation matching mechanisms, was acquired by CASI, a commercial push-broom camera, in the VNIR (VISIBLE+NEAR IR) range, in 48 spectral channels and also in 19 spectral channels. The set of data-cubes of 19 channels was chosen for this test. The corresponding panchromatic images, needed for the test, were generated by summing up the intensities of the 19 different layers, for every data-cube.

The location of the channels in the spectral axis, and their widths, are given in the following table:

| Consecutive number | Number of the channel in CASI | Center of channel | Width of channel |
|---|---|---|---|
| 1 | 281 | 440.3 nanometer | 10 nanometer |
| 2 | 270 | 460.3 nanometer | 10 nanometer |
| 3 | 264 | 471.5 nanometer | 10 nanometer |
| 4 | 260 | 478.5 nanometer | 5 nanometer |

-continued

| Consecutive number | Number of the channel in CASI | Center of channel | Width of channel |
|---|---|---|---|
| 5 | 256 | 486.3 nanometer | 10 nanometer |
| 6 | 248 | 501.2 nanometer | 10 nanometer |
| 7 | 238 | 520.0 nanometer | 10 nanometer |
| 8 | 221 | 551.6 nanometer | 10 nanometer |
| 9 | 195 | 600.6 nanometer | 10 nanometer |
| 10 | 189 | 612.0 nanometer | 10 nanometer |
| 11 | 182 | 625.2 nanometer | 10 nanometer |
| 12 | 169 | 649.9 nanometer | 10 nanometer |
| 13 | 155 | 676.6 nanometer | 10 nanometer |
| 14 | 149 | 685.0 nanometer | 7 nanometer |
| 15 | 143 | 699.5 nanometer | 10 nanometer |
| 16 | 111 | 760.6 nanometer | 10 nanometer |
| 17 | 90 | 800.8 nanometer | 10 nanometer |
| 18 | 53 | 852.5 nanometer | 10 nanometer |
| 19 | 48 | 881.1 nanometer | 10 nanometer |

To perform the test and the analysis, a tracking point was chosen. The spatial area of the window of interest was specified as two pixels in each direction from the tracking point. That is, the window of interest is of 5×5 pixels in the panchromatic image. In accordance with a spatial coverage of 5×5, a 5×5×19 cube of interest was selected from the corresponding hyper-spectral data-cube.

The test was supposed to determine in which case the uniqueness of the information was clearer, using the suitable similarity measure. The performance criterion was the number of false matches, obtained in the entire panchromatic image, for the window of interest, versus the number of false matches, obtained in the entire cube, for the cube of interest. Which obviously means that the smallest number of false matches found demonstrates the best performance, or the best utilization of the information in the algorithm mechanisms. A match was defined for every point in which the correlation, or hyper-correlation, value exceeded the acceptance thresholds.

The adaptive thresholds that were automatically defined, for the correlation and hyper-correlation functions, were respectively TP and TH. In order to check the sensitivity to the threshold value, and to also indirectly check the robustness of the threshold and the correlation mechanisms, performance was also checked with a threshold lowered by 1% and 10%.

Clearly, there were many reasons to anticipate that the hyper-correlation mechanism would show clear-cut improvement in performance, being that it is based on more information. But, the results were worse, mainly in the sensitivity to threshold changes, as we will see below. Continuing the research we were able to find an explanation for this and to define a corrected and more effective hyper-correlation function.

In Table 1 are shown the results of the two-dimensional correlation function whose values range between 0 and 1. Performance was measured on a panchromatic image and also on three separate monospectral layers, each one of which represents, for the purpose of the test, a panchromatic image acquired in a narrow band. The results of the correlation and the threshold mechanisms on each one of the four images were not essentially different, even when they represented different information: a "green": layer, a "blue" layer, an "NIR" layer and an image that comprises the sum of the 19 layers. High sensitivity to slight changes in the value of the automatic threshold is noticeable, and it caused an exponential increase in the number of points that exceeded the threshold. This indicates a flat correlation surface, as can also be seen from the statistical measurements of the surface: average, standard deviation and the distance of the maximum from the average, in standard deviation units.

TABLE 1

Number of points that exceeded the threshold in a 512 × 512 photo under two-dimensional correlation, and correlation surface data

|  | TP | 0.99TP | 0.9TP | Average | Standard Deviation | MAX Distance |
|---|---|---|---|---|---|---|
| Panchromatic image | 30 | 3095 | 192626 | 0.9010 | 0.1270 | 0.7797 |
| 480-490 nanometer | 11 | 2719 |  | 0.8961 | 0.1292 | 0.8037 |
| 545-555 nanometer | 25 | 2784 |  | 0.9012 | 0.1277 | 0.7738 |
| 795-805 nanometer | 32 | 3040 | 181779 | 0.8934 | 0.1270 | 0.8398 |

The number of pixels that exceeded the threshold lowered by 10% in the panchromatic image reached 73% of total pixels.

Compared to the two-dimensional correlation, Table 2 presents hyper-correlation performance. It showed an even deeper sensitivity to threshold changes, which demonstrates even more flatness on the hyper-correlation surface, as can be seen also from the surface statistics. Even though the non-lowered threshold gave us less false signals, when compared to two-dimensional correlation, it's clear that the higher sensitivity denotes hyper-correlation as inferior to two-dimensional correlation.

TABLE 2

Number of points that exceeded the threshold in the hyper-correlation cube, and hyper-correlation surface data.

|  | TH | 0.99TH | 0.9TH | Average | Standard Deviation | MAX Distance |
|---|---|---|---|---|---|---|
| 19 layer cube | 2 | 54992 | 219832 | 0.9338 | 0.1296 | 0.5105 |
| 3 layer cube: NIR, Blue, Green | 6 | 54756 | 220598 | 0.9012 | 0.1277 | 0.7738 |

If we keep in mind that the total points checked is 512 squared, then the lowering of the threshold by 10% permits most of the points, approximately 84%, to exceed it, as can be observed in the table.

Of course, it is possible to use hyper-correlation matching for cubes with any size L, as long as L is larger than 1. This also includes cubes obtained by reduction through sifting channels of another cube, or those that are obtained by reducing the number of layers through mergers, which are done by adding several layers into one layer. In Table 2 are also shown the hyper-correlation performances of a degenerate cube that contains only three spectral layers (the same three layers that were checked separately in two-dimensional correlation). The results were similar in quality to the results obtained by the 19-layer cube, and just as disappointing. The reasons for choosing these layers and the reasons for performing hyper-correlation on a reduced cube that contains only those layers will be explained below.

Attempting to exploit the obvious difference between these layers in order to improve results, an alternative matching mechanism for the cube was devised. In this mechanism a logical "and" of the two-dimensional correlation results, obtained for each layer separately, was taken and the surprising result was a significant reduction of the accepted points.

Namely, those points that exceeded simultaneously the thresholds on each one of the three images. For example: for a threshold reduced by 1%, the logical "and" of the results of those that exceeded the threshold for the three images gave a total of 460 points, while in each one separately there were a few thousands of points that exceeded the threshold, as seen on Table 1. The good results of the logical "and" are even more surprising when we compare it to the hyper-correlation results (54576 points that passed the threshold reduced by 1%, as can be observed in Table 2).

The great differences in performance obtained from the three layers in the two different methods are puzzling. It seems that the unique information does exists in the various spectral layers, otherwise the logical "and" would not have lowered the number of points in such a drastic manner. Therefore, the explanation must be that the mathematical tools used did not fully utilize the available information. That is, it seems that the manner in which the hyper-correlation was defined is not suitable. We also found that it caused a crowding of the results, that is to the flat hyper-correlation surface, and in this manner also to the inability to define a robust threshold mechanism. At the same time, being that the definition was linked both to the spatial components and to the spectral components, it is possible that only an adjustment of the mechanisms was necessary, or their improvement, in order to obtain better results that are, at least, like the logical "and" results of processing each layer separately. The steps taken are explained below.

Definition of Improved Hyper-Correlation Combining Spatial and Spectral Information In the hyper-correlation function definition (2) we included products dependent on the angles between spectral vectors These are the angles between vectors in the L-dimensional space, where L is the number of spectral channels. In the same L-dimensional space, all these vectors accumulate in the first quadrant only, out of the $2^L$ quadrants. (The term quadrant is borrowed from the two-dimensional axis system). For example, the three-dimensional space has eight quadrants, although the spectral vectors, supplied by the three-layer cube, are all found in the first quadrant. This is due to the fact that the measurements in each one of the layers cannot have negative values, and thus, they are contained only the quadrant in which all the coordinates are positive. This accumulation causes only a slight difference in the angle between matching and non-matching pairs. As a result, the difference between the hyper-correlation values at the matching points and the non-matching points is small. The accumulation is, obviously, a detrimental occurrence and a mechanism must be found that will cause the vectors to scatter to the other quadrants and in that manner also cause an opening in the accumulation and clearer differences between matching and non-matching situations.

In addition to this accumulation into one quadrant, there are other problematic factors:

If we can imagine a collection of all the points represented by the vectors as a sort of L-dimensional hyper-ellipsoid, that tends to be narrow and elongated, for the field data we have specified, the vectors will all be inside a narrow hyper-cone that serves as an envelope to the hyper-ellipsoid. In addition, its main axis direction is close to the main diagonal direction of the first quadrant, namely the line that creates equal angles on all the axis, a factor that worsens even more the problem of the too small angular differences between the vectors.

Figure 6:
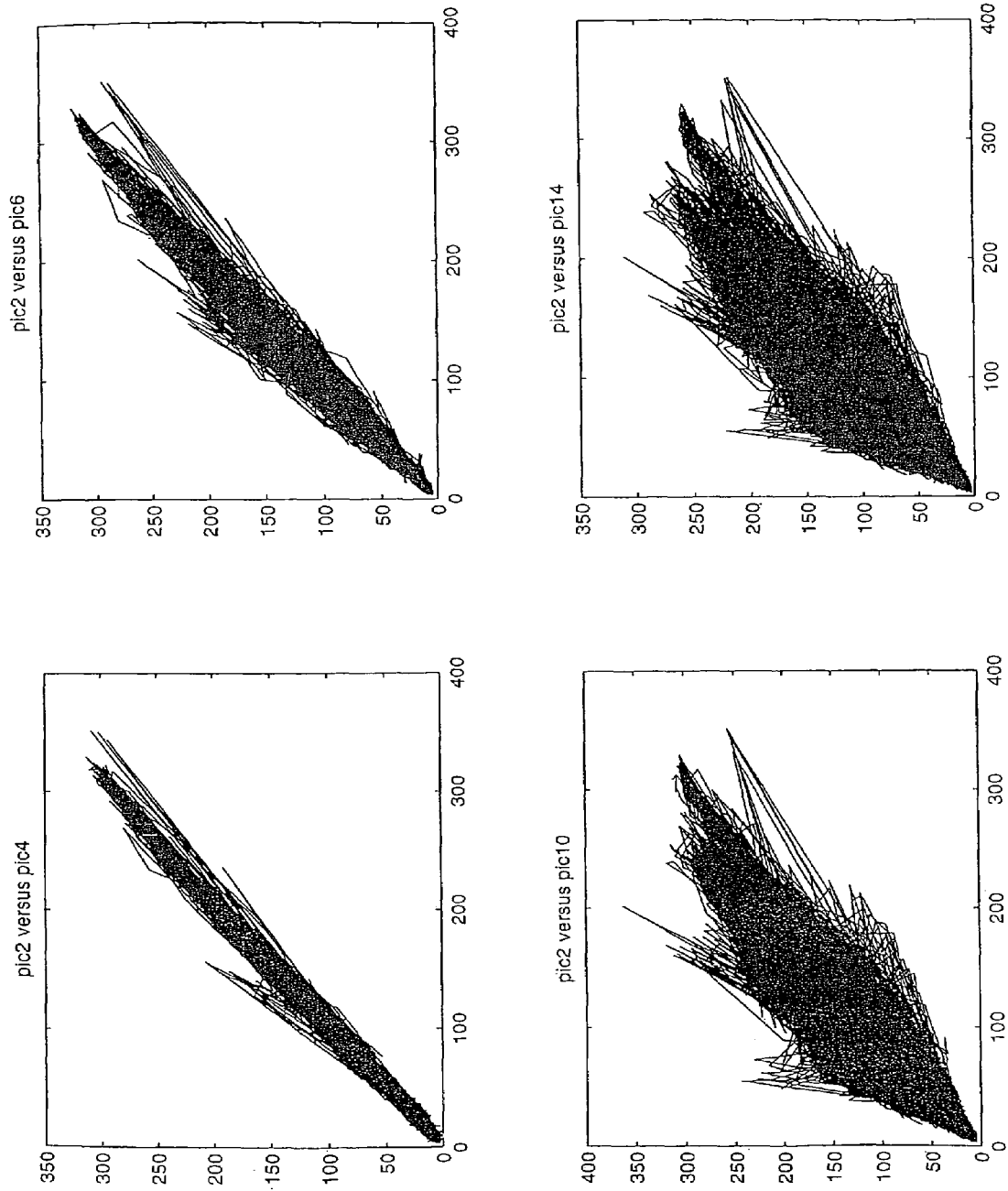
FIGS. 6 and 7 show various projections of the hyper-correlation hyper-ellipsoid.

Its easy to see that this is the nature of the vector distribution in the spectral space, from the example below. We will present the hyper-ellipsoid by "projecting" it perpendicularly on some of the coordinate planes, there are $L*[L-1]/2$ planes of this type, and there we will obtain connections between pairs of spectral layers. We will choose four pairs, out of the 171 possibilities, as an example, all of which are firstly taken from the visible range (VIS). In FIG. 6, that shows projections of the hyper-ellipsoid onto four coordinate planes in the visible range, it's possible to see the elliptical shapes whose behavior is exactly as we have described.

The reason for this behaviour is the high correlation between adjacent layers that causes the ellipse to be narrow, and in the direction portrayed. See the Graph of Layer 2 versus Layer 4 in FIG. 6. Even when a pair of layers is at the two extremes of the visible range, the correlation will still be high enough to create an ellipse that has a large axis difference. See the Graph of Layer 2 versus Layer 14 in FIG. 6.

Figure 7:
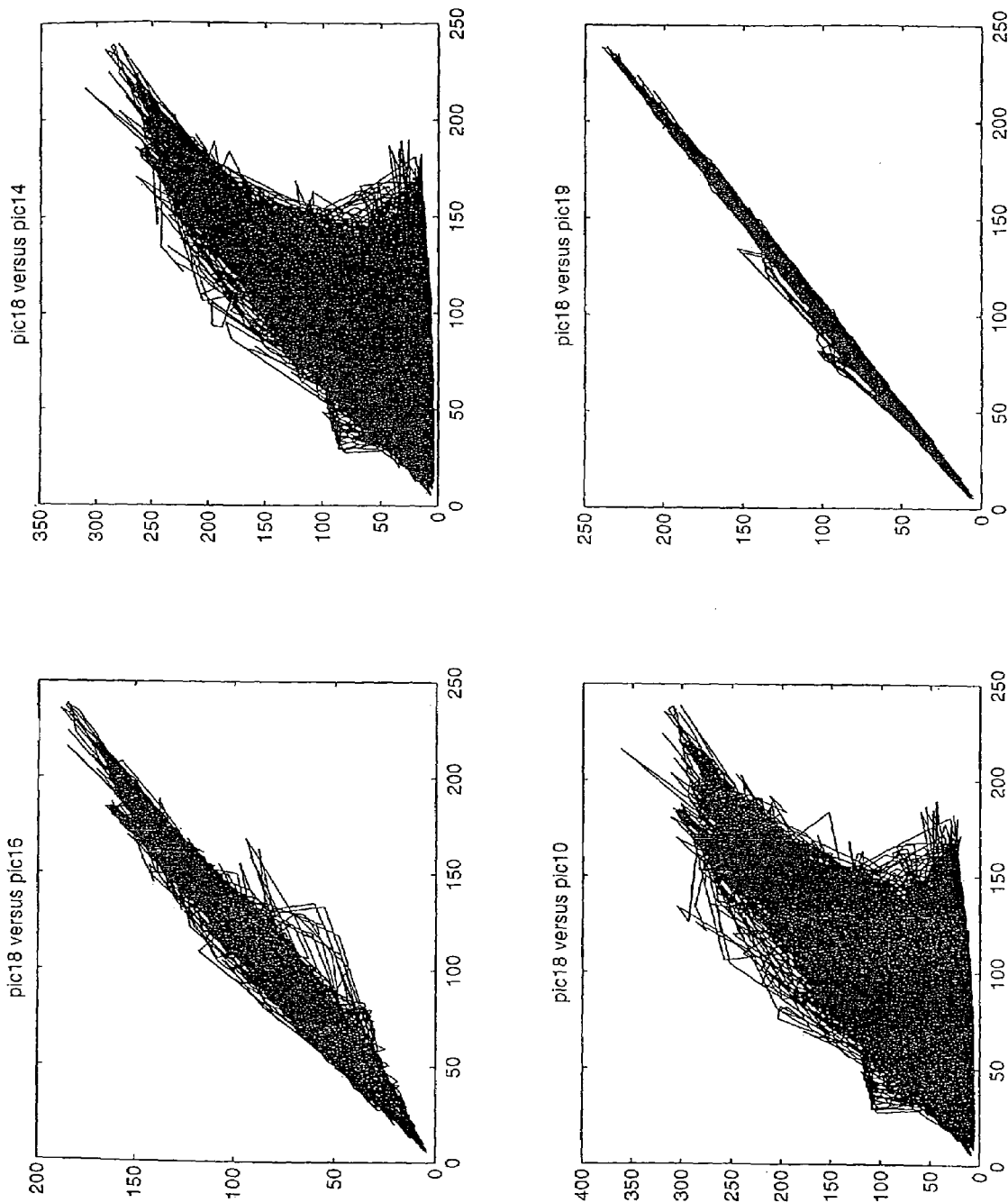

This is also correct for pairs of layers taken from the Near Infrared Range, (NIR), like the graphic connection between Layer 18 and Layer 19 in the upper-left hyper-ellipsoid projection in FIG. 7, and also between Layer 18 to Layer 16 in the lower-right hyper-ellipsoid projection in FIG. 7. But if the pairs are mixed, NIR and VIS, as in Layer 18 versus Layer 14 in the upper-right hyper-ellipsoid projection in FIG. 7, and also Layer 18 versus Layer 10 in the lower-left hype-ellipsoid projection in FIG. 7, the elliptical shape is slightly blurred. This seemingly occurs because of the anti-correlative behavior of some of the picture components, probably because of the vegetation, about which we shall expand below.

A more exact analysis, by way of Principle Component Analysis of the data, provides the main axis directions, and also demonstrates the narrow dimensions of the hyper-ellipsoid when it shows that only a small number of axes, out of all the axes, have an appreciable width.

Comment: This behavior is also characteristic in the individual case of standard color photographs, and justifies the conversion from coordinates Red, Green and Blue to coordinates Hue, Saturation and Intensity, so that the intensity axis I is in the main axis direction of the ellipsoid, and in that manner a better sources allocation for the data is achieved.

This accumulation, being an inherent problem, needs to be dealt with. Fortunately, there is an intuitive and straightforward way through which it can be solved, and in an astonishingly simple manner. This is done through a different positioning of the axes system: if we shift the place of the axes origin to the center of the hyper-ellipsoid, this causes an angular distancing of the vectors. In the shifted axes system, the vectors will spread out in a radial manner from the new origin, and in that way all the quadrants will be occupied. This permits a full utilization of the angle range, an opening of the accumulations and a differentiation between the various matching and non-matching situations.

It is easy to calculate the center of the hyper-ellipsoid, since its coordinates will obviously be composed of the means points of the various spectral channels.

For a geometric-intuitive explanation of the need for change in the axes origin, the character of the change and its significance, a physical explanation can also be given: when all the vectors crowd into the first quadrant, the test of the angles between them only shows difference, or similarity, in the spectral shape, "color". But the angle is blind to the difference in intensity that is expressed by the difference in the vectors length. The invariance to intensities is an advantage when we search for the specific "color" in the picture, whose normalized signature is found in the signature library. But in the problem we have here, the relative intensity of the signature of the various objects is predetermined, and stays constant in time-consecutive pictures. We wish to exploit this relative situation in the hyper-correlation mechanism. The shift of the origin toward the center of the ellipsoid refers the vectors to the intensities average and this expresses the intensity differences to some degree.

Based on this principle, the hyper-correlation definition was changed so that it expresses the relative condition of the intensities. This change brought about the expansion of Hyper-correlation values into the −1 to 1 range. The adaptive threshold mechanisms remained as they were. The mathematical expression for normalized hyper-correlation through the moving of the axes origin appears in formula (3).

$$HN(m,n)=(1/k*h)*\Sigma_{i=1:k,j=1:h}((X'(i,j)-M_x)/\|X(i,j)-M_x\|) \\ *((Y(\underline{m},\underline{n})-M_y/\|Y(\underline{m},\underline{n})-M_y\|) \quad (3)$$

where HN(m,n) is the normalized hyper-correlation function value for the spatial location (m,n) in the current data-cube, X(i,j) is the spectral vector in location (i,j) of the tracking cube X, and the vector X'(i,j) its transpose, and M, the mean of the spectral vectors in the reference cube Y is the sub cube around (m,n) in the current data-cube, Y($\underline{m},\underline{n}$) its spectral vector in location ($\underline{m},\underline{n}$) and $M_y$ the current mean of the spectral vectors, $\underline{m}$=m−[k/2+1]+i ;and $\underline{n}$=n−[h/2+1]+j, ∥o∥ is the norm of vector o, and [g] stands for largest integer smaller than g.

In order to fairly compare performances, the two-dimensional correlation function was similarly normalized by shifting the origin to the mean intensity value, and expressing the pixels intensifies relative to that mean. The values of such a normalized two dimensional correlation function will also range from −1 to 1. this normalized two-dimensional correlation function is expressed in (4).

$$CN(m,n)=\Sigma_{i=1:k,j=1:h}((X(i,j)-M_x)*(Y*(\underline{m},\underline{n})-M_y))/(\Sigma_{i=1:k,j=1:h}(X(i,j)-M_x)^2*\Sigma_{i=1:k,j=1:h}Y(\underline{m},\underline{n})-M_y)^2)^{1/2} \quad (4)$$

where CN(m,n) is the normalized correlation function value for pixel (m,n) in the current image, X(i,j) is the intensity value in pixel (i,j) of the tracking window X, and $M_x$ is the mean of the intensities in the reference image Y is the window around pixel (m,n) in the current image, Y($\underline{m},\underline{n}$) its intensity in ($\underline{m},\underline{n}$), $\underline{m}$=m−[k/2+1]+i;and $\underline{n}$=n−[h/2+1]+j, and $M_y$ the mean of intensities in the current image, and [g] stands for largest integer smaller than g.

Comparison Between the Performance of Normalized Hyper-Correlation and Two-Dimensional Correlation Functions In order to check the effects of this change on the results, the process was run again on the same data, replacing the correlation functions for the new ones. Indeed, there was a significant improvement in the results, as far as the number of false matches is considered, and also in the reduced sensitivity to changes in the acceptance thresholds values. See Table 3. For example, lowering the acceptance threshold by 10% gave 213 matches, a result that is better by several order of magnitude than the results obtained before the improvement in the Hyper-Correlation function. It is also interesting to note that a considerable part of the false signals were on objects of the same kind, and the reason for this is the contribution of the spectral component in the hyper-correlation function, since similar objects have similar colors.

(From now on, whenever Hyper-Correlation, or Two Dimensional Correlation, is mentioned, we mean Improved Version, even if we omit the word)

TABLE 3 the number of points that passed the threshold in the Improved Hyper-Correlation versus the number of points that passed the improved two-dimensional correlation, with similar threshold mechanisms, and also hyper-correlation/correlation surface statistics

| T = TP for 2D correlation T = TH for hyper-correlation | T | 0.99T | 0.9T | Average | Sigma | Max distance |
|---|---|---|---|---|---|---|
| 19 layer cube | 9 | 19 | 213 | −0.1279 | 0.4599 | 2.4525 |
| Panchromatic photo | 232 | 513 | 7220 | −0.0167 | 0.5129 | 1.9823 |

Figure 8:
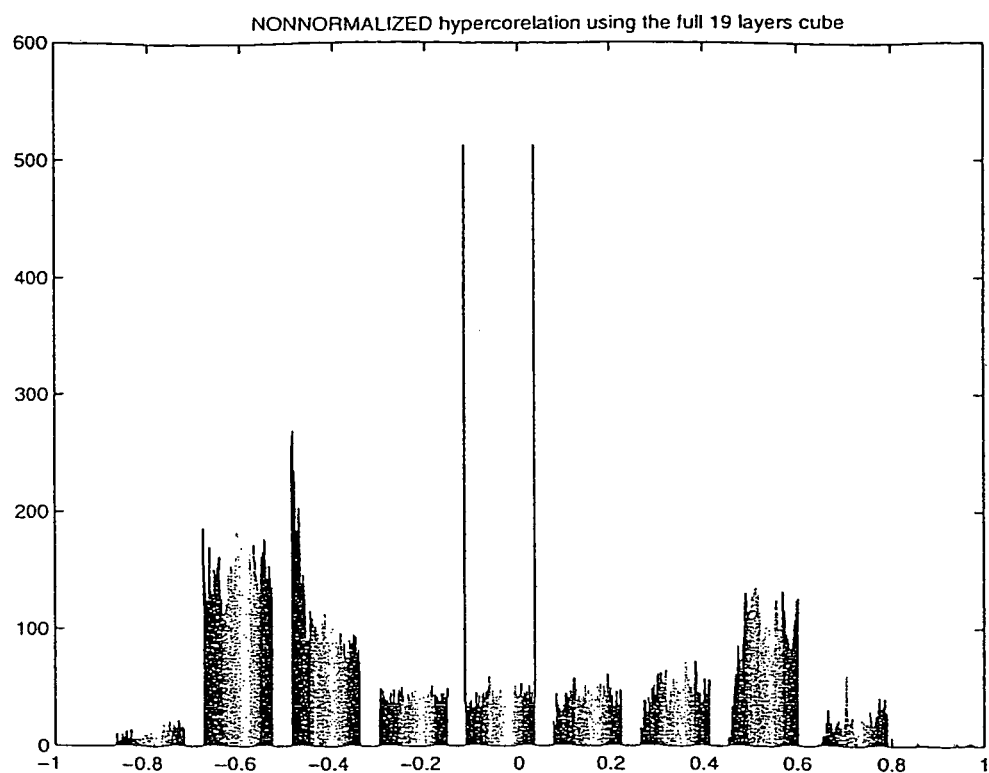
FIGS. 8 and 9 show histograms of 19-layer hyper-correlation after and before shifting the coordinate system origin to the center of the hyper-ellipsoid.
Figure 9:
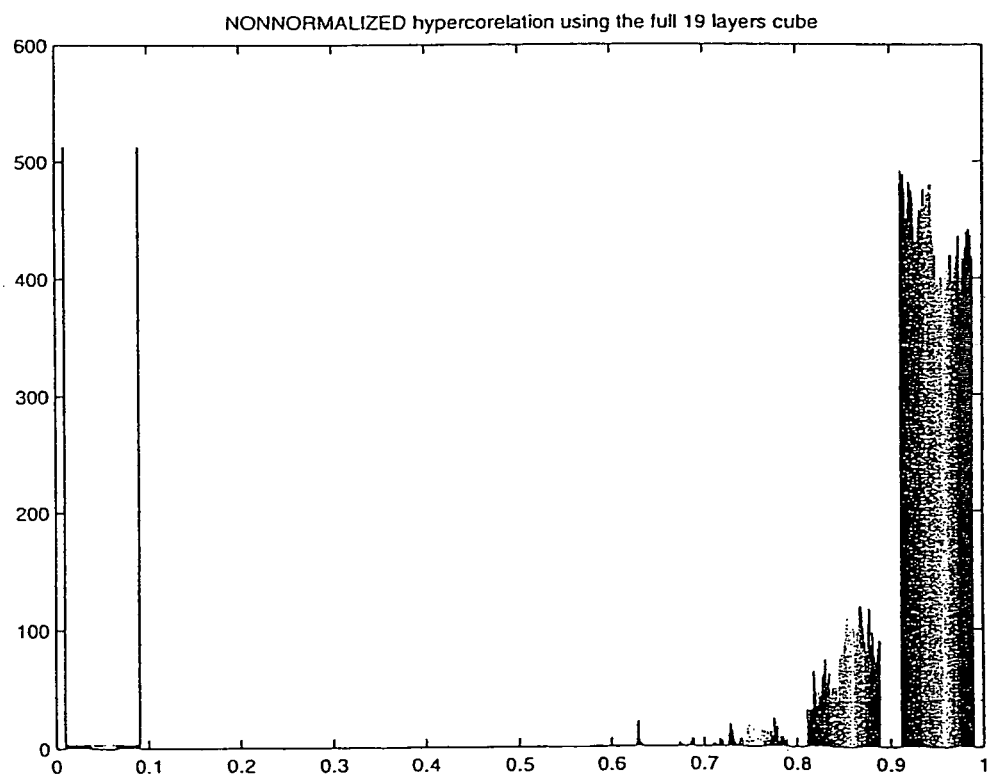

The low sensitivity to changes in the acceptance threshold values shows that the hyper-correlation surface is less problematic, as can also be observed in the criterion of the surface maximum distance from the surface average, which stands at 2.5 units of standard deviation. This improved behavior can also be seen in the histogram of surface values shown in FIG. 8 that shows a histogram of normalized improved hypercorrelation results on the 19-layer cube. Analysing the histogram one may notice the existence of natural threshold points at 0.8, for example, which can be taken as an alternative to the existing threshold mechanisms, if needed for some reason. In comparison, the histogram of the surface before the improvement showed the accumulation of most surface points at values close to 1 and actually proved that there is no possibility for a robust automatic threshold mechanism for that same correlation function, as can be clearly observed in FIG. 9 that corresponds to FIG. 8 before the improvement.

At the same time, on Table 3 are presented also the results of operating the improved two-dimensional correlation and here also we see an improvement in results and a lowered sensitivity to the threshold value. Actually, the two-dimensional correlation in this specification is the correlation function being generally used, and its advantage is also in the fact that it can overcome the changes in illumination levels in consecutive images (though the mean subtraction).

From the comparison of results obtained from the Improved hyper-correlation function and the improved two-dimensional correlation function, it is possible to be convinced that spectral information indeed results in higher performance than that obtained from the panchromatic image. The improvement, that was expected, justifies the introduction of the spectral dimension as an essential addition for computer vision systems.

In large systems, where there are no strong constraints on space resources and computer power, or those which would require maximum performance, it is worthwhile to make use of the full improvement offered by multiple channels. In systems of that type we should include all the channels that contribute to performance and of course, only those that do so.

However, when speaking about systems with constraints (price, computer resources, development time and so on), the logical way is to reduce the number of channels, paying for it in performance, but to offer a feasible system that can be easily realized. This, of course, under the condition that the reduced performance level shall express a significant improvement versus the use of two-dimensional information only.

The question is whether it is possible to point out such an option, and to specifically recommend the preferred spectral channels and an inexpensive off-the-shelf sensor that will be able to produce them.

In order to respond to this question, we shall slightly deviate from the subject and discuss the interesting phenomenon of hyper-spectral sensing, from which we wish to derive the reduction of channels.

Differences in the Information Found in the Various Spectral Channels

In this section we shall discuss one of the central problems of hyper-spectral sensing, which is mainly how to identify the spectral channels, their location and width, which contain the information we require in order to perform a specific task. There are a number of approaches and methods, but it is hard to state that there is already a satisfactory solution to the problem. In each one of the approaches, it is desirable to begin with a high spectral resolution and a consecutive presence of channels, and from there to continue with a sifting of channels and/or increasing their width through fusion (merging). The data that we have is in a spectral resolution of 10 nanometers or better, and this is a reasonable starting point.

During the stages of this research we adopted an approach that says that it is possible to understand the problem through an examination of data behavior. Naturally, the most promising direction was an examination of the similarity between the various channels. Logic tells us that when the similarity is low between pictures obtained in different channels, each one of those channels has unique information that is not found in the other channel. And, when the similarity is very high, they can be unified or one of them can be relinquished—providing they both show the same level of similarity with other channels. In other words, Channel I and Channel J will be merged or one of them will be sifted out, if I and J are highly similar, according to the specified measure, and provided the similarity of I with any other channel K is very close to the similarity of J with that same K, where K represents every one of the other channels. The last condition is the condition that seemingly exists whenever the first condition exists, and that comes from the definition itself. A reasonable way to check the similarities is through what is defined as a normalized Covariance Matrix, which we shall denote CM in short. The (i,j.) element in this matrix is the value of the normalized correlation between the picture of Channel I and the picture of Channel J. That is, a symmetrical matrix is obtained, whose values range between −1 and 1. And indeed, this is the tool we chose to check channels similarity for data obtained from various sources and various spectral resolutions.

The CM display was chosen, luckily, to be a gray scale picture in which white represents value 1. Choosing this type of display instead of a display on a numbers table, for example, accentuated a very interesting phenomenon causing it to appear visually.

In this matrix, white values appear throughout the diagonal, as the auto correlation of each channel is obviously 1. It was also possible to expect the gradual reduction of the gray scale as it recedes from the diagonal, in each of the four directions, as was actually observed since then the distance in the spectral axis increases. But another phenomenon that was discovered was wavelengths in which the transition, or the reduction in gray scale, or a reduction in the similarity rate, were stronger and sometimes even sharply so. These "break lines" returned and appeared more or less at the same wavelength even when different and distanced areas are examined, at the same or at different, data collection flight. They delineated in the CM "blocks" of almost uniform gray scales in which the elements differ from each other by small percentages, less than 4% in their numerical value, so that they pointed out clusters of channels with a high similarity.

Thus we define a "block" to be a sub-matrix in the CM, where the difference between every two elements will not be higher than a certain low value U %, for example 4%, as a typical figure. A "block" of channels will consist of these channels that participate in the creation of that same sub-matrix of the CM.

Figure 10:
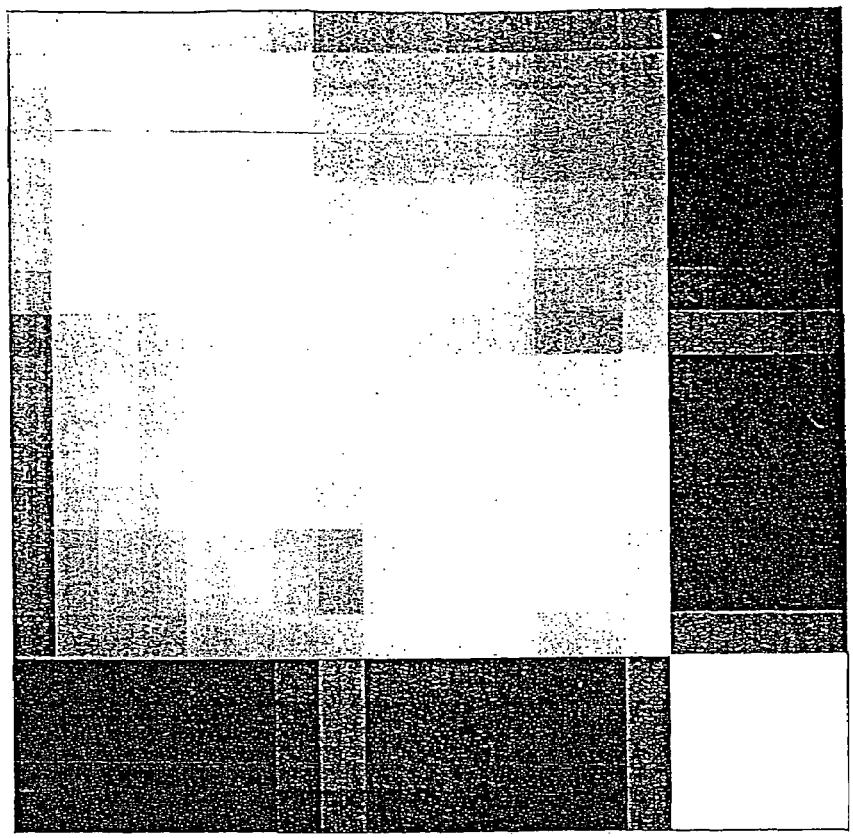
FIGS. 10 and 11 show the block structure of the normalized covariance matrix in areas with vs. without vegetation.
Figure 11:
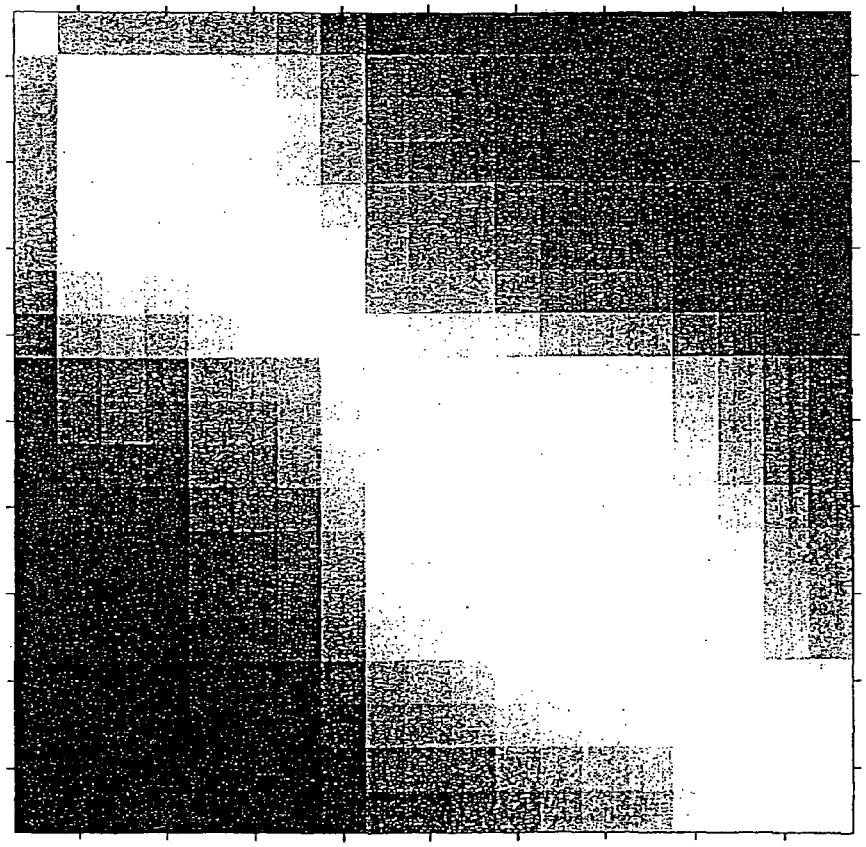

On top and inside the main "blocks" an additional "block" structure with less substantial differences may appear. These structures did not recur in the CM of the different areas whilst the basic structures recurred in every CM of every area that was checked. FIGS. 10 and 11 below are examples of the "block" structures. FIG. 10 shows the "block" structure in an area with vegetation. FIG. 11 shows the "block" structure in an area without vegetation.

Since the "blocks" are characterized by high and almost uniform values of the correlation between the participating channels, they actually offer a formula for a reduction in the number of required channels, or for the merging of adjoining channels. Meaning that, if there is a channel "block" with a high correlation, a representative channel can be taken within it and the rest can be abandoned, or it is possible to sum the "block" of narrow channels into a wider channel, where the information loss in those procedures is small due to a high correlation. And this is how it was done later on. But let us first try to find a logical explanation for the appearance of these structures.

One of the prominent "break lines" of the correlation blocks is found at the transition from the VIS, visible light, to the NIR, Near InfraRed, around the 700 nanometer region. That is exactly where the large reflectivity jump of the vegetation is found, sometimes called the "Chlorophyll Edge". Therefore the explanation for this break line, which recurred in every CM of every area, was the presence of vegetation in all the imaged locations. Focusing on areas that seem to be free of vegetation surprisingly did not change the phenomenon, but we must be careful and say that it is possible that they also had particles of vegetation or atrophied forms of vegetation.

Figure 12:
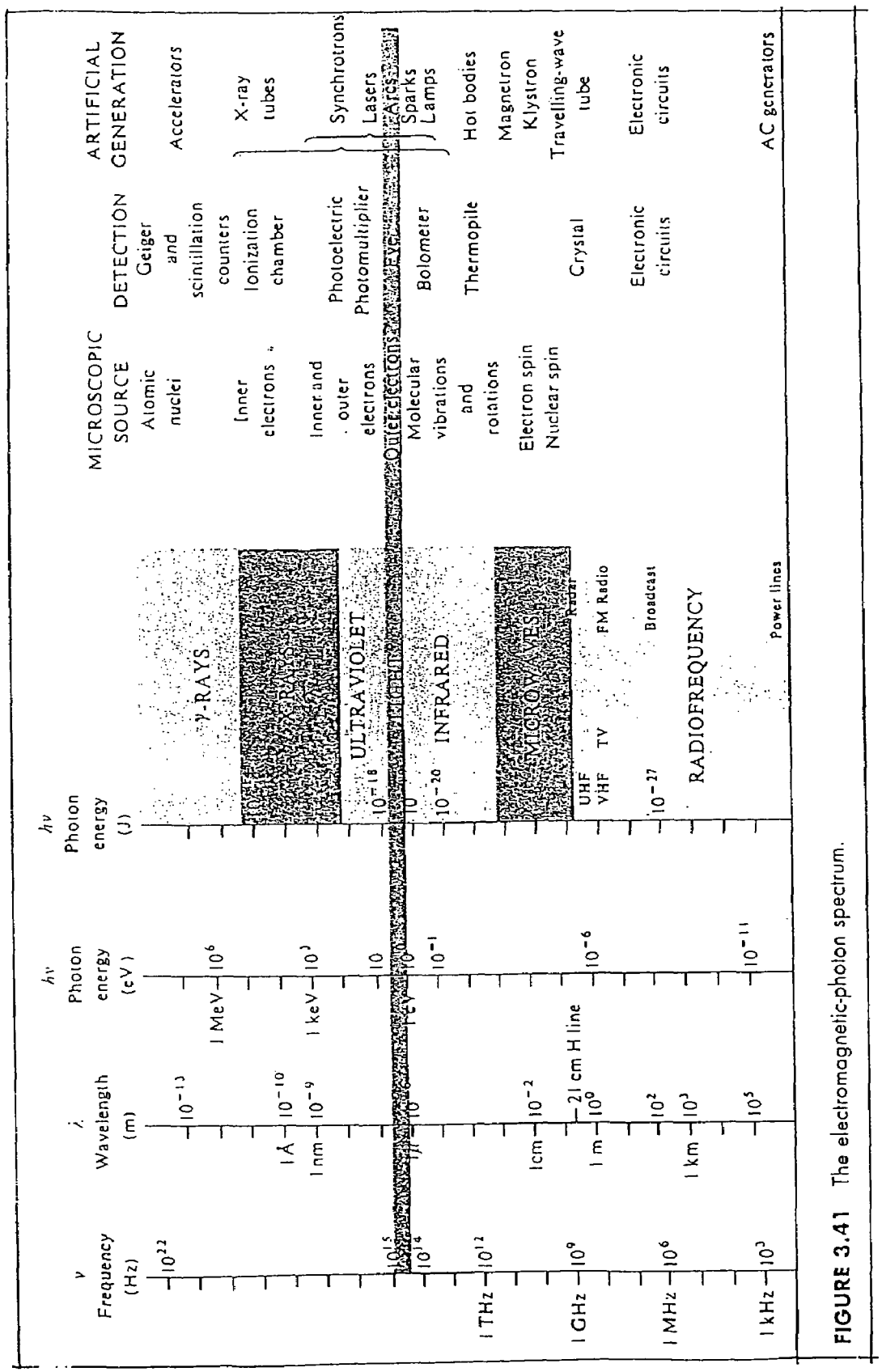
FIG. 12 is a reproduction of a table of sources and detectors of electromagnetic radiation in various spectral bands.

Another explanation to the break line could be the changes in the physical source that causes absorption/reflectivity. In the Studies of Optics book by Hecht [2], page 77 and page 596, we learn that around the 700 nanometer area the physical source of photon absorption changes, from merely an external electron behaviour to a molecular vibration, also summarized in the Table on page 74 (see FIG. 12). If this is actually the reason, we must still search for an explanation for the physical source of another recurring break line in the visible region in around 600 nanometers.

At the same time, this break line together with other break lines can maybe be explained as consequences of the vegetation, inasmuch as chlorophyll has a number of other weak and narrow absorption/emission lines, as for example, a maximal absorption at 443 nanometer and 665 nanometer and on the opposite a peak at 555 nanometer, and that is actually where we find some of the break lines between the blocks of the CM. But this explanation does not justify the continuity of the similarity in the consecutive channels which yields a wide "block", as can be seen in FIGS. 10 and 11.

A possible explanation, that the origin of the phenomenon is in atmospheric interference which was not removed, is not acceptable, being that in the CM the effects of multiplying and additive influences are cancelled out by the mathematical definition and remembering that the linear model is accepted approximation to atmosphere effect, and also because the phenomenon recurs in images at different places and conditions.

It must be noted that until recently, there was no mention in international technical literature of the interesting patterns in CM or, of course, of the possibility of using them. Recently, in April 2000, an article was published [3] that presents this phenomenon as a part of research results in the detection of land mines. The impression is that the group of researchers accidentally found this phenomenon, just like we have done here. They don't explain it sufficiently, but they note that the phenomenon should be investigated. In the examples they present, we find CM of very vegetated and slightly vegetated areas, and areas without vegetation (a gravel road). The break line for the 700 nanometer area strengthens according to the contents of vegetation. From the very poor picture quality it is hard to judge whether the break line for the CM of the gravel road totally disappeared but it is obvious that it weakens there.

Even if chlorophyll, and only chlorophyll, is the cause of the break line, it is still very worthwhile to utilize the observed phenomena, because vegetation, or its degenerated forms, is expected to exist in many areas, including built-up areas and in dryer areas also, where desert plants exists.

In the study described previously we actually already used the high correlation channel "blocks". This occurred when three channels were chosen for the degenerated cube, on which we tested hypercorrelation before improvement. These channels were not chosen incidentally, but were chosen as representatives of the three dominant and recurring "blocks". Therefore it could be observed that they represented the 19-channel data cube well. The channels chosen are the narrow channels that appear in Table 1, channels that we called Blue, Green and NIR. Indeed, Table 2 showed that the reduction of the cube to these 3 channels made almost no change to the level of performance (which was pretty bad) applying the hyper-correlation to it, in relation to the full cube.

Now, when we have improved the hyper-correlation, it is interesting to check it on the same reduced cube, and see if it is possible to obtain good results near to those obtained on the full cube. And if this is possible, then we are supplying a solution to spectral tracking that is applicable and less "expensive".

We also wish to check the various alternatives of reduction in accordance to the above criteria, and the options to reduce down to a minimum of two layers. We will also check the implications of substituting the narrow representative channel, which was taken from a "block", with a wider channel that is obtained from the sum of "block" channels.

Applying the Improved Hyper-Correlation on Reduced Layer Cube

We will first examine the performance when applying the of Improved Hyper-correlation on a three-layer cube, Blue, Green and NIR.

As anticipated, according to the above analysis, the reduction of 19 layers of the cube to three layers, which appropriately represent its contents, gave results that were relatively close to those of the full cube. Even if there is a certain harm to performance level, this is negligible when compared to the great savings obtained when relinquishing 16 channels. In Table 4 are presented the results of applying the Improved Hyper-correlation on 19-channel cube and on three channel cube, for the various thresholds A comparison with Table 3 shows that the results of applying Improved Hyper-correlation on a spectral cube reduced to three layers were also significantly better than the results of applying Improved Two-dimensional Correlation on a panchromatic image.

TABLE 4

Number of points that exceeded the threshold under improved hyper-correlation of a full cube, and of a cube reduced to three representative layers, and Improved Hyper-Correlation surface statistics.

|  | TH | 0.99TH | 0.9TH | Average | Sigma | MAX Distance |
|---|---|---|---|---|---|---|
| 19 layer cube | 9 | 19 | 213 | −0.1279 | 0.4599 | 2.4525 |
| 3 layer cube: NIR, Blue, Green | 11 | 26 | 309 | −0.1366 | 0.4552 | 2.4969 |

It is possible to conclude that:

At the cost of a slight reduction in performance, it is possible to reduce the cube to only 3 spectral layers correctly chosen from the given 19 layers, for tracking using Improved Hyper-correlation, and to still obtain noticeably better results than in using Improved Two-dimensional Correlation, on panchromatic images.

The question that must be asked now is whether it is possible to reduce the number of channels to 2 and still minimize further reduction in performance level. In other words, is it possible to relinquish one of the three representative channels, and if so, which are the essential channels? The test was made by executing Improved Hyper-correlation on a two-layer cube, which is obviously the absolute minimum possible, in the three possible combinations. In Table 5 are shown the results obtained for the three pairs: (NIR, Green), (NIR, Blue) and (Green, Blue). As expected, the reduction in performance became more significant, and in one case it became essential. This occurred when we removed the channel from the NIR "block", which shows how essential it is, and therefore:

From the three channels that represent the three main blocks, the channel that represents the NIR "block" has a highest importance, under the criteria of Improved Hyper-correlation.

The conclusion is that, at the cost of additional slight performance reduction, it is possible to use only two channels, on the condition that one of them is taken from the NIR "block".

TABLE 5

Number of points that exceeded the threshold, and data statistics of the Hyper-Correlation surface, when applying Improved Hyper-correlation on a cube degenerated to two and three layers.

|  | TH | 0.99TH | 0.9TH | Average | Sigma | MAX Distance |
|---|---|---|---|---|---|---|
| 3 layer cube: NIR, Blue, Green | 11 | 26 | 309 | −0.1366 | 0.4552 | 2.4969 |
| 2 layers: Green, NIR | 25 | 39 | 503 | −0.1128 | 0.4177 | 2.6641 |
| 2 layers: Blue, NIR | 23 | 38 | 660 | −0.1146 | 0.4121 | 2.7047 |
| 2 layers: Blue, Green | 360 | 422 | 1663 | −0.1366 | 0.5318 | 2.2129 |
| 3 layer cube: Red, Blue, Green | 65 | 80 | 346 | −0.1559 | 0.4927 | 2.3461 |

Is it possible to compensate for the removal of the NIR channel by taking three channels from the visible range? The natural choice is the subdivision "block" of the CM that correspond to the red, the green and the blue in a color camera, which makes it immediately available for the degenerated cube. The results obtained are also indicated in Table 5, and show that indeed, the addition of the third channel improved the performance level, but did not definitely compensate the lack of the NIR, and what's more: the performance level of the two layers, one of which is NIR, was better in many aspects. At the same time, as it is an "off-the-shelf" option", when the color camera supplies the layers, it should be considered as a potential solution, that should be thoroughly checked out.

The question of the width of spectral layers is still open, with a color camera or with other reduced data cubes. We shall refer to that question below.

The Reduced Solution: Narrow or Wide Spectral Bands?

During the reduction process, we started out with a cube with 19 layers that cover narrow bands of 5-10 nanometers, and we showed that it is possible to reach two levels of reduction, three layers and two layers, wherein each one has a cost, which rises accordingly, in reduced performance. The aim of the channel reduction was, as can be remembered, to enable a short-term implementation with inexpensive and available technologies. When we check the possibility of implementation with "off-the-shelf" cameras, we could encounter the problem of narrow band filtering to match channels as were tested above. Therefore, we have to examine the application of Improved Hyper-correlation on wide two-layer spectral cubes. From it, we will also be able to extrapolate to cubes with three wide layers.

Since we anticipate the lowest correlation between the cluster of visible range channels VIS, and the cluster of NIR range channels, as we observed in the previous section regarding the behavior of the CM, and as reinforced by the results in Table 5, we will create a cube with two wide layers that correspond to those ranges: a FULL-VIS layer obtained by the sum of the channels up to 700 nanometers, and a FULL-NIR layer obtained by the sum of the channels from 700 nanometers and up. Merging all the channels in the visible range, we merged two of the basic "blocks", and lost the different information that they supply. Applying Improved Hyper-correlation on that cube, for the same object, and with the same threshold mechanisms used on the full cube, produced the results indicated on Table 6. To permit easy comparison, Table 6 includes, once again, the result gotten of the full cube.

A comparison with the results of Improved Two-dimensional Correlation on the panchromatic image, which are noted on Table 3, show that despite a lowered performance level when compared to the full cube, the results of the hyper-correlation applied on two wide layers are still significantly better.

TABLE 6

Number of points that exceeded the threshold in the Improved Hyper-correlation cube, for different threshold values and hypercorrelation surface statistics.

| | TH | 0.99TH | 0.9TH | Average | Sigma | MAX Distance |
|---|---|---|---|---|---|---|
| 19 layer cube | 9 | 19 | 213 | −0.1279 | 0.4599 | 2.4525 |
| 2 layer cube: FULL_VIS, FULL_NIR | 23 | 39 | 648 | −0.1362 | 0.5100 | 2.2278 |

If these promising results represent a typical situation, then we have a powerful tool that permits a significant improvement in performance, at a very low computation "cost", which exhibits low requirements in the sensor and in hardware.

In order to verify this assumption, a comprehensive and more specific test must be performed. For this purpose, thirteen different objects were randomly chosen. On these objects a tracking point was taken and around it a 5×5 window of interest and a 5×5×2 cube of interest, for the two-dimensional correlation and for the hyper-correlation, respectively. Instead of talking the usual adaptive threshold, which does not permit a "transparent" comparison between performance levels, since its value is different in each of the two mechanisms, seven threshold values were chosen, beginning at 0.95 and down to 0.65, in steps of 0.05.

For these thirteen objects and the different threshold values, the number of points that exceeded the threshold in the two matching mechanisms were added up. Their average values are presented in Table 7. The results definitely show the improvement obtained through the hyper-correlation, even in its most degenerated case.

TABLE 7

Average of points that exceeded the threshold in Improved Hyper-correlation of the cube reduced to two wide layers, Visible and Near Infrared, and in Improved Two-dimensional Correlation, for 13 different objects, and for 7 threshold values.

| Average number of points that exceeded the threshold upon applying of hyper-correlation on the two-layer cube VIS_ALL & NIR_ALL, on thirteen objects and seven threshold values. | | | | | | | Average number of points that exceeded the threshold upon applying of two-dimensional correlation on a panchromatic picture, on thirteen objects and seven threshold values. | | | | | | |
|---|---|---|---|---|---|---|---|---|---|---|---|---|---|
| 0.95 | 0.9 | 0.85 | 0.8 | 0.75 | 0.70 | 0.65 | 0.95 | 0.9 | 0.85 | 0.8 | 0.75 | 0.70 | 0.65 |
| 2 | 33 | 136 | 396 | 3476 | 4955 | 9039 | 73 | 848 | 2530 | 5410 | 9496 | 14627 | 20708 |

Figure 13:
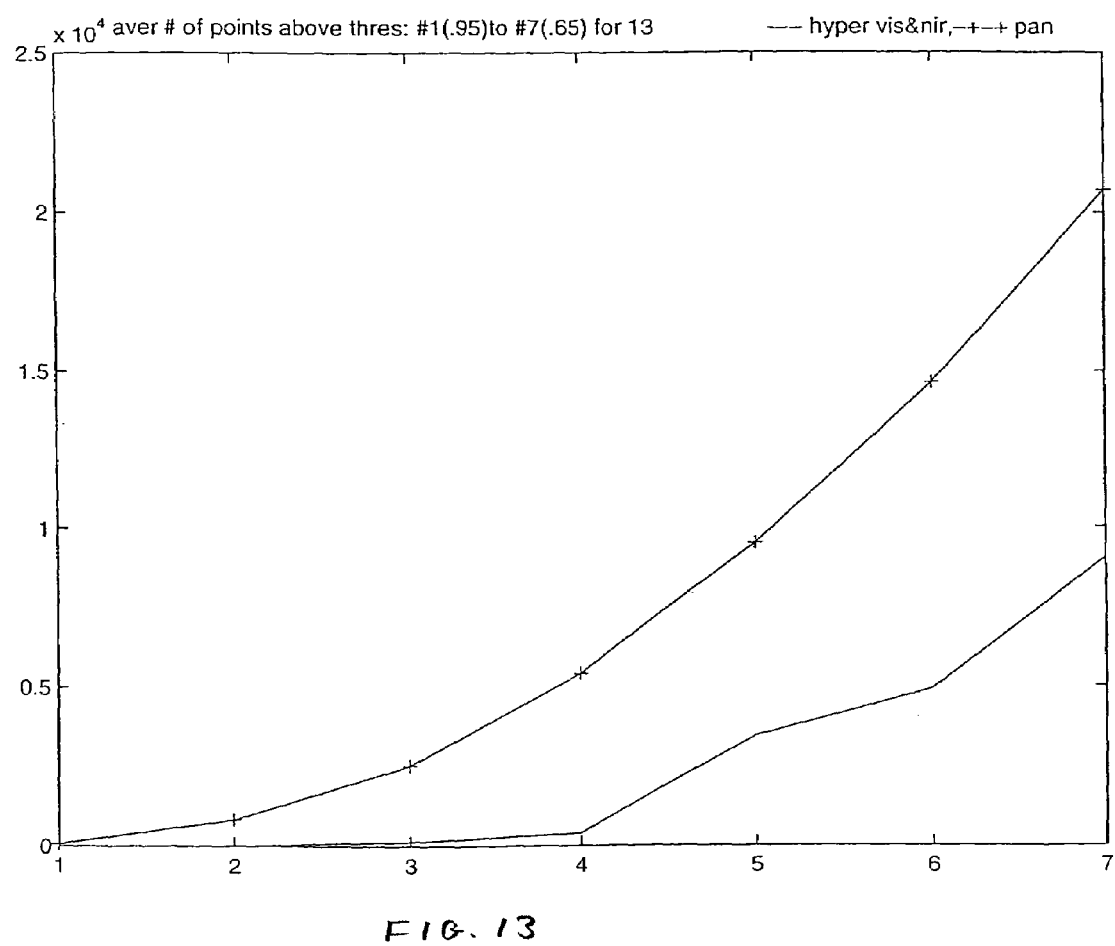
FIG. 13 is a graph corresponding to Table 7.

The graphic description of the results is shown on FIG. 13. The curve for the improved two-dimensional correlation is (--+---+--). The curve for the improved hyper-correlation is (--------). And in conclusion:

At the slight cost of splitting the 450-1000 nanometer range into two layers, and the use of Improved Hyper-Correlation, a significant performance improvement is obtained, under the criterion of false matching, compared to Improved Two-dimensional Correlation.

Combined Hyper-Correlation: Using the Advantages of Each Mechanism

Until now, we have shown the improvements attained from hyper-correlation, even in its degenerate case. The improvement in performance level was based on a sufficiently strong spectral distinction, which did not vanish even when we used wide layers where some of the spectral information was lost. The spectral information is composed of spectral shape expressed through the direction of the spectral vector, and also an intensity expressed through the length of the spectral vector. There was only partial reference to the intensity in our metric through the origin shift to the vectors' mean, as was described in previous sections. Full utilization will be attained when the vector length is incorporated in an explicit manner. Ignoring the intensity could theoretically harm performance in specific situations, as will be described below.

In comparison, the two-dimensional correlation is based solely on the intensities.

We could describe a hypothetical situation in which the two-dimensional correlation will have an advantage over the hyper-correlation, and other situations in which both correlation mechanisms will have difficulties. For example, a situation in which the window of interest or the cube of interest is taken from an image of a structure made of homogenous material, whereas parts of which create shadowing, or from regions of vegetation where typically light and shadows play. In the shadowing areas we will obtain the same hue that is found in lighted areas, but in lower intensities. The various intensities create a situation that is exploited by the two-dimensional correlation. On the other hand, the hyper-correlation will have difficulties in this situation. When the shadowing is less pronounced, also the two-dimensional correlation faces problems.

In order to benefit from the advantages, and avoid disadvantages of the two mechanisms we will combine them into one function that preserves the good traits of each one of them separately. Keeping in mind that false matches is the main problem, we generate the simple combination that will reflect indications of no-match obtained from either mechanism by applying simultaneously a Hyper-Correlation, and a Two-Dimensional Correlation on the sum of the two layers. At every point (m,n), the minimal outcome from both mechanisms will be taken, as the Combined Hyper-Correlation outcome at that point, namely:

$$JHC(m,n)=\text{minimum } (CN(m,n), HN(m,n)) \quad (5)$$

This mechanism remains very inexpensive computationally and it guarantees to perform, in the worst case scenario, no worse than the Two-Dimensional Correlation. In almost every case, we expect to have better performance, and believe that even in those problematic situations, there will be a significant improvement, being that the points of difficulty of both mechanisms do not coincide.

We will check, for example, two of these real situations.

1. A problematic situation for the Hyper-Correlation where an almost homogenous color field cell is checked, but with shadowed points. A simple situation for Two-Dimensional Correlation.

2. A problematic situation for both of them is when we check a field cell that is almost homogenous in color and in intensity.

Figure 14:
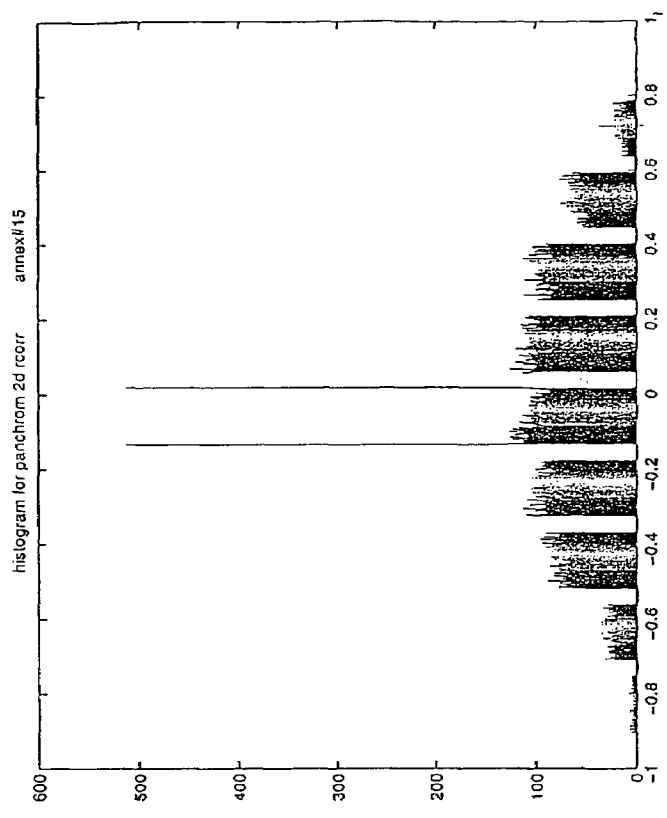
FIGS. 14 and 15 show various histograms of hyper-correlation vs. two-dimensional correlation.
Figure 14:
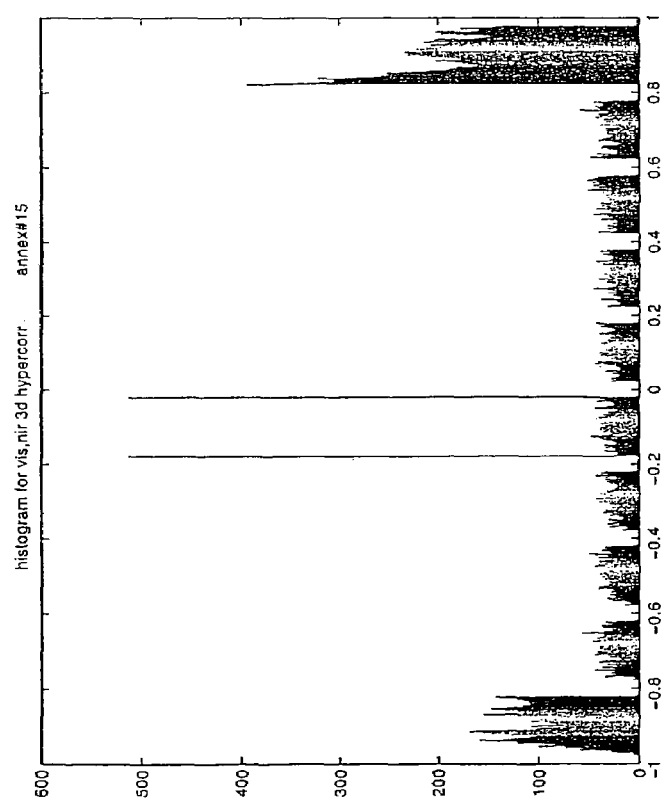
Figure 15:
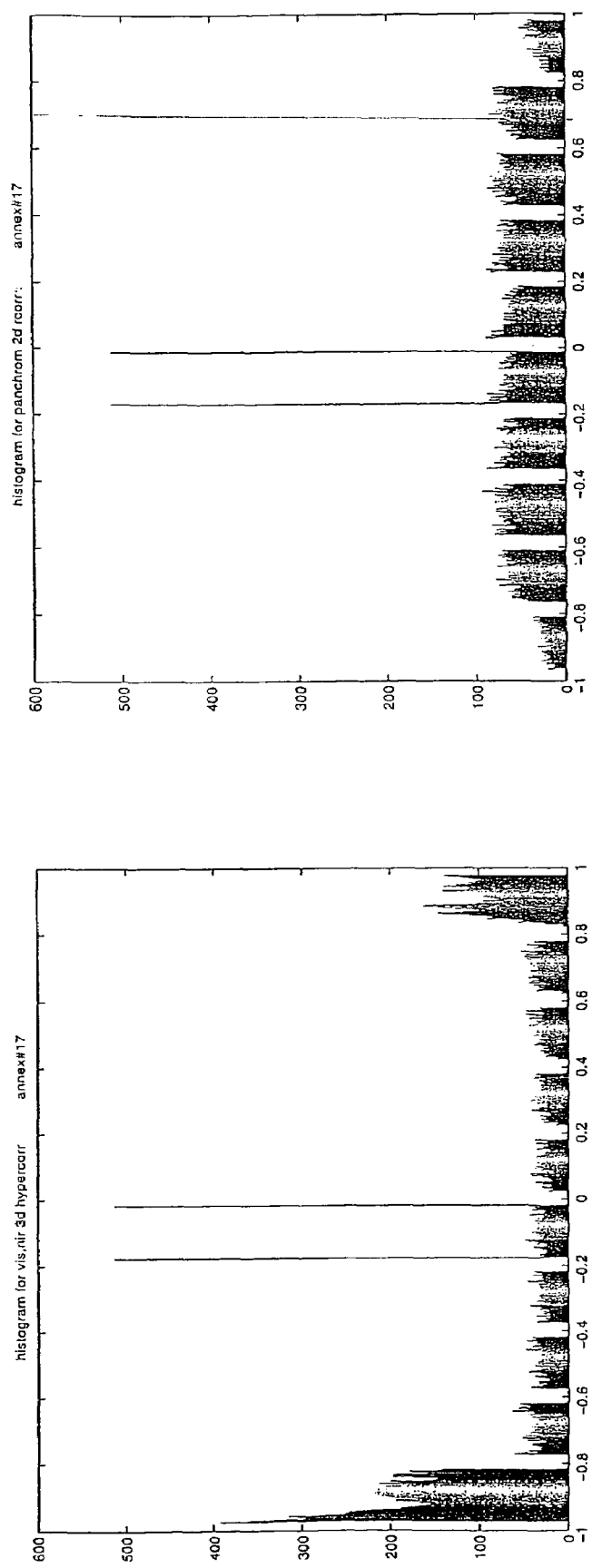
Figure 16:
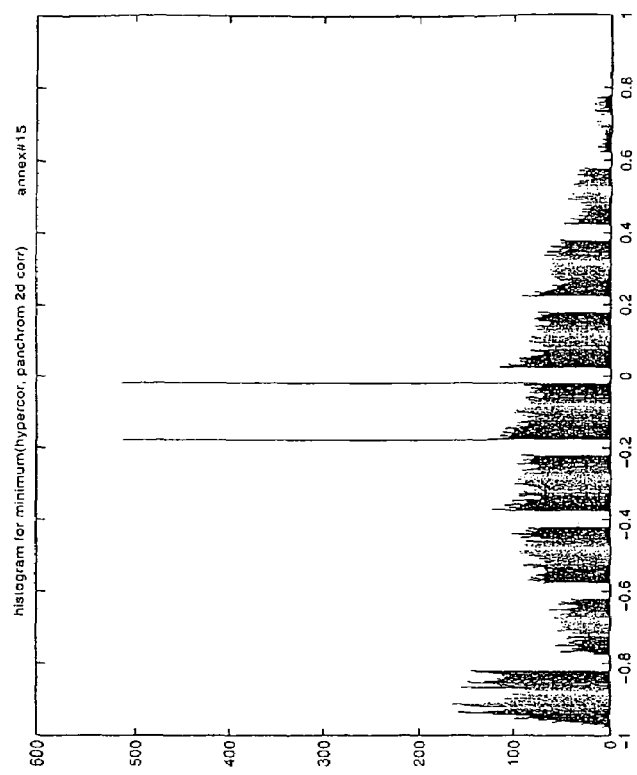
FIG. 16 shows histograms of combined hyper-correlation.
Figure 16:
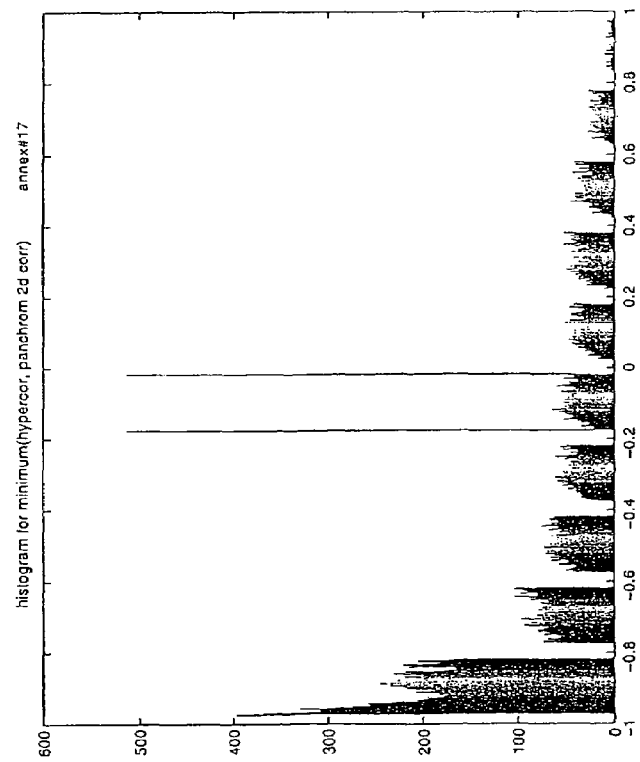

FIG. 14 shows the two histograms of the Two-Dimensional Correlation (right) and Hyper-Correlation (left) surfaces for a type-I situation, that stresses the advantage of one method over the other. In FIG. 15 are shown the histograms (Two-Dimensional Correlation on right: Hyper-Correlation on left) for a type-2 situation, and they show a case of shared difficulty. FIG. 16 shows the histograms of the Combined Hyper-Correlation(s) for situations 1 (right) and 2 (left). It's easy to realize how much the results were improved, where the correlation values in the erred points were "pushed" to the left and received low values, creating a clear-cut division between the good and bad matches, meaning that the number of points that exceeded the threshold, for the various threshold points, became dramatically smaller.

This enlargement in performance, obtained through the Combined Hyper-correlation gives us a tool for performance improvement in area tracking, since it also handles field cells whose distinction is not sufficiently clear, as is shown in the histograms on FIGS. 14 to 16.

Finally, we will perform a repeat run on the thirteen objects in order to see the additional improvement we can get by applying the combined Hyper-Correlation. The average results for the seven threshold values are presented on Table 8, and they show that a noticeable improvement was attained applying Combined Hyper-Correlation compared to the Hyper-Correlation, and an improvement of more than one order of magnitude compared to Two-Dimensional Correlation. This is a very significant improvement.

| | Threshold values by type of correlation | | | | | | |
|---|---|---|---|---|---|---|---|
| | Avg. qty of points. Threshold = 0.65 | Avg. qty of points. Threshold = 0.70 | Avg. qty of points. Threshold = 0.75 | Avg. qty of points. Threshold = 0.80 | Avg. qty of points. Threshold = 0.85 | Avg. qty of points. Threshold = 0.90 | Avg. qty of points. Threshold = 0.95 |
| Combined | 1739 | 836 | 398 | 160 | 53 | 4.5 | 1 |
| Hypercorrelation | 9039 | 4955 | 3476 | 396 | 136 | 33 | 2 |
| 2D Correlation | 20708 | 14627 | 9496 | 5410 | 2530 | 848 | 73 |

CONCLUDING

When splitting the 450-1000 nanometer range into two layers, and using Combined Hyper-correlation, we obtained an improvement of more than one order of magnitude in performance, per the number of false matches criterion, compared to Improved Two-dimensional Correlation.

Figure 17:
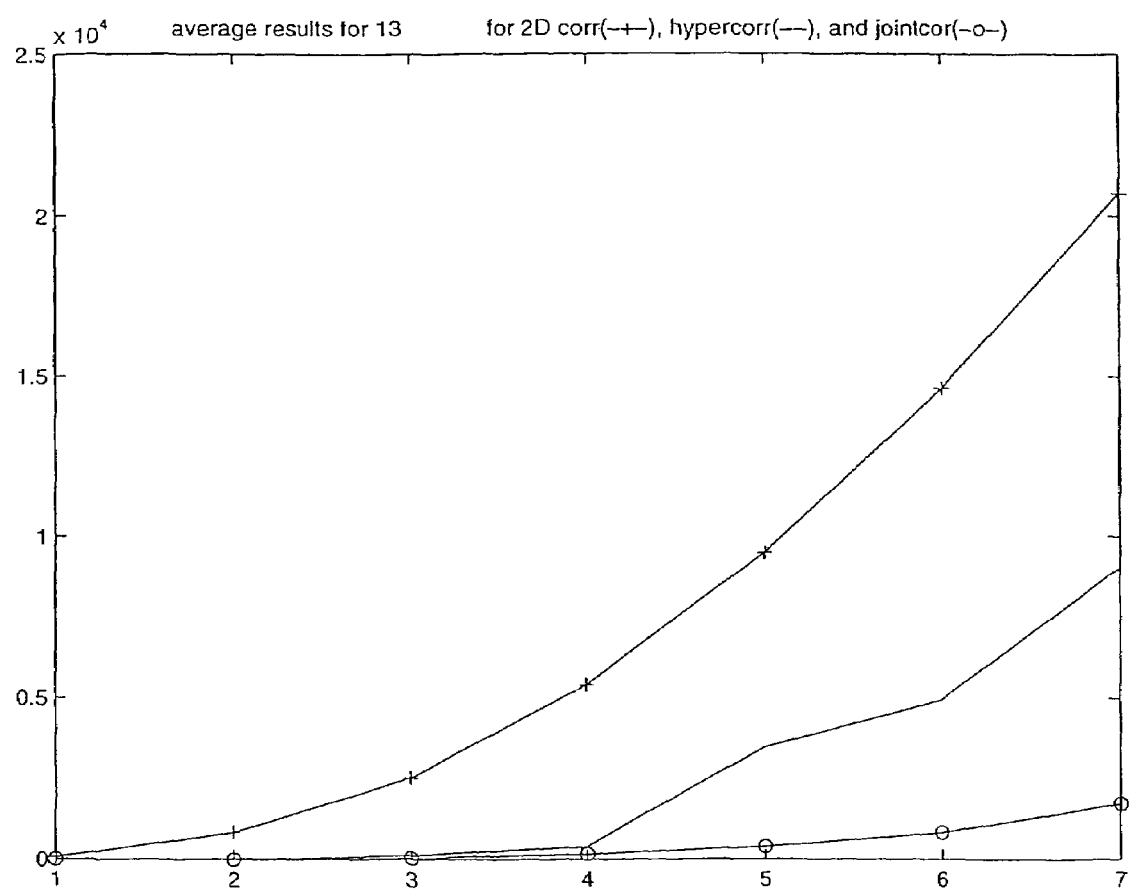
FIG. 17 is a graph corresponding to Table 8.

In FIG. 17 are shown graphs of the performance indicated on Table 8, that is, the average of performance level on thirteen objects for seven threshold values, for each of the three mechanisms. The curve for the two-dimensional correlation is (--+---+--). The curve for the hyper-correlation is (--------). The curve for the combined hyper-correlation is (o-o-o--). The graphic description clearly shows the improvement attained, and in particular, the improvement of Combined Hyper-correlation.

The significance of what is presented above is that we are suggesting here a new mechanism, easy to apply, which offers outstanding improvement possibilities to existing correlation mechanisms. As to its implementation, we must see how to obtain from a standard monochrome CCD camera, that covers the 450-1000 nanometer area, a division into two ranges of Visible and Near Infrared, through the use of filters or an equivalent mechanism.

REFERENCES

[1] Charles L. Bennell "LIFTRIS The Livermore Imagery FTIR Spectrometer" Fourier Transform Spectroscopy: 11$^{th}$ International Conference, edited by J. A. Haseth, American Institute of Physics Conference Proceedings 430, 1998, pp 170-186.
[2] H. Hecht, "OPTICS", Addison Wesley, Third Edition.
[3] A. Kenton et al., "Joint Spectral Region Buried Land Mine Discrimination Performance", Proceedings of SPIE on Detection and Remediation Technologies for Mines and Minelike Targets V, Volume 4038, April 2000, pp 210-219.

Annex

In order to check the repeatability of the phenomenon of "blocks" on the matrix of the normalized Covariance Matrix (CM), about which we wrote in this report, data collected in other geographic areas and different environmental conditions was taken, as for example different times of day, different seasons, and so on.

Figure 18:
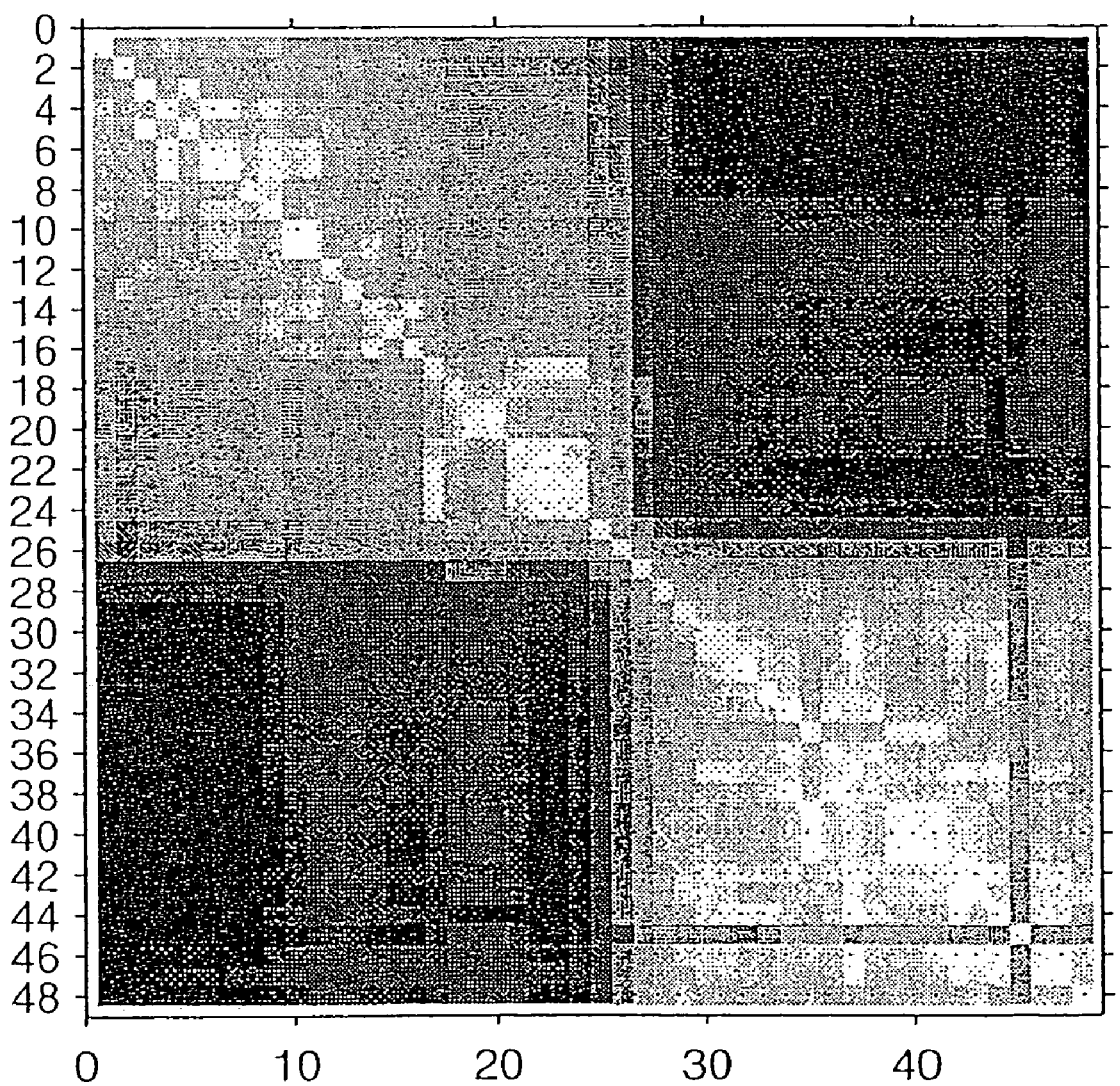
FIGS. 18-22 are normalized covariance matrices for five different representative areas.

In addition, in order to have the possibility to define more accurately the boundaries of the "blocks", which are the wavelengths on which are the "break lines" in the succession of correlation values between the adjoining layers, data cubes of 48 spectral layers were taken. These layers were imaged in spectral bands of 10-12 nanometers wide, which covered, consecutively, the 430 to 990 nanometer range. That is, the Visible range and the. NIR range. Approximately twenty data cubes of 48.times.512.times.512 pixels were examined For each one of these, the normalized Covariance Matrix, which measures 48.times.48, was calculated, and presented through a gray scale matrix, in which the maximal value 1 was marked as white. The data cubes covered urban areas, rural areas, mixed areas, areas in which a major road covers a significant part of the image, and so on. FIGS. 18 up to 22 describe the results of five normalized Covariance Matrix CM in the five representative areas (field cell numbers 32, 52, 31, 82 and 61, respectively), which are different in character from each other. Despite the difference between them, it must be assumed that in each area, including urban areas, a vegetation exists although in various quantities. This fact is noted since it is assumed that the clear-cut dominant spectral behavior of the vegetation represents an important component in the structure of the normalized Covariance Matrix, as specified in the report.

If we observe the five different Figures we will see that all have the three basic "block" structure, on which more complicated "block" patterns are superposed, seemingly derived from the special contents of each field cell. The behavior is according to the specified in the report.

The "break line" that represents the clearest demarcation line of the "blocks", appears between spectral layer number 26, whose center is at 715 nanometer, and spectral layer number 27, whose center is at 730 nanometer. Meaning that, the "break line" is found approximately at 720 nanometer. A weaker "break line" appears between layers number 16 and 17, whose centers are at 600 nanometer and 612 nanometer respectively, that is, its location is approximately at nanometer 605.

These "break lines" appear in all the normalized Covariance Matrixes presented herein which represent field cells with different contents, and also in other additional cells. It must be noted that, even if the variety of cells was great and they could be considered as representing numerous and common landscapes, field cells of sandy areas were not checked, and neither were desert landscapes.

Figure 19:
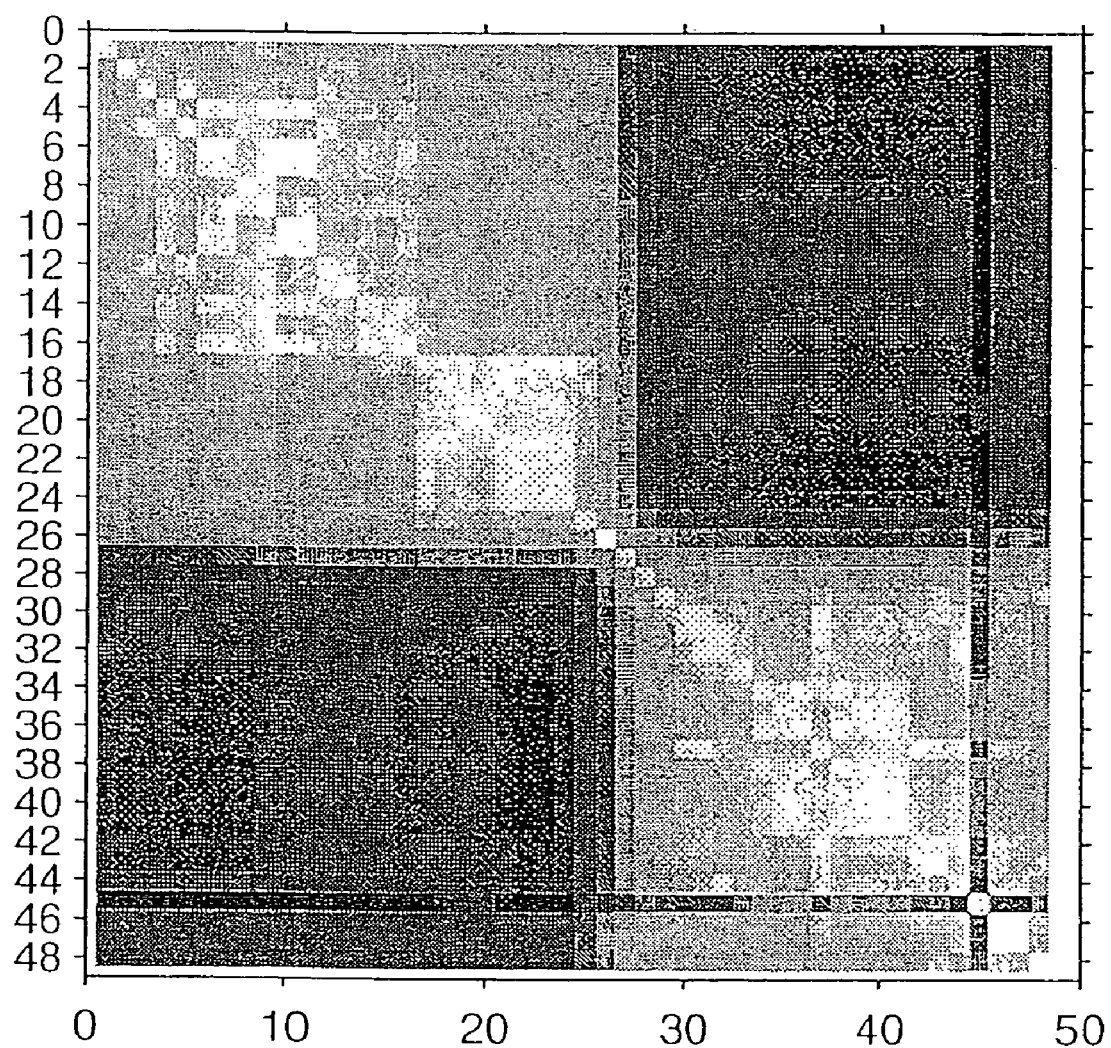
Figure 20:
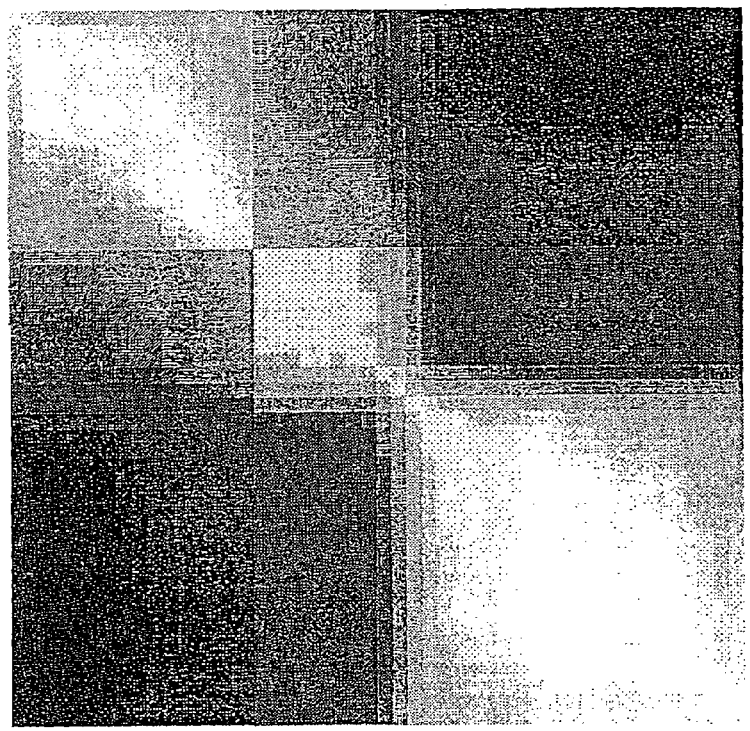
Figure 21:
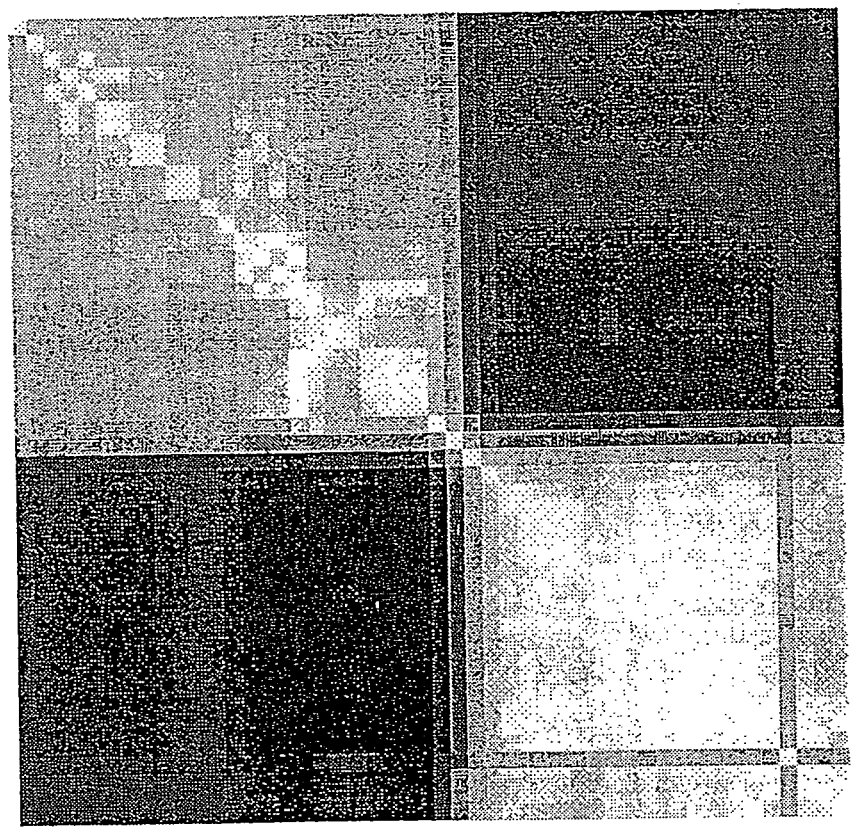
Figure 22:
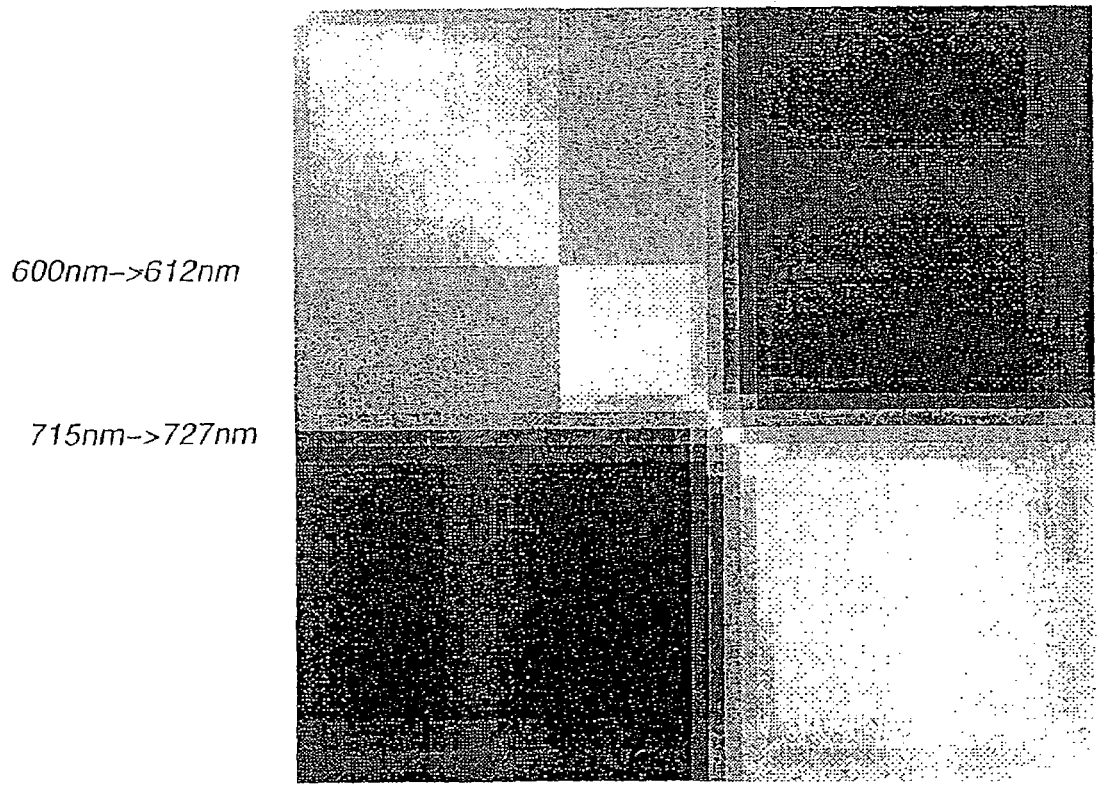

In addition to these two "break lines", there are other, less noticeable lines, which demarcate "blocks" representing characteristic components of the specific field cell, and are not equally noticeable in the different matrixes, as is particularly noticeable in FIGS. 18 and 19.

While the invention has been described with respect to a limited number of embodiments, it will be appreciated that many variations, modifications and other applications of the invention may be made.

What is claimed is:

1. A method of tracking a target, comprising the steps of:
   (a) acquiring a first spectral image of a scene that includes the target;
   (b) designating a spectral reference window, in said first spectral image, that includes a respective plurality of pixel vectors;
   (c) acquiring a second spectral image, of said scene, that includes a respective plurality of pixel vectors; and
   (d) hypercorrelating said spectral reference window with said second spectral image, thereby obtaining a hypercorrelation function, a maximum of said hypercorrelation function then corresponding to a location of the target in said scene.

2. The method of claim 1, wherein said hypercorrelating is effected by steps including: for each said pixel vector of said second spectral image:
   (i) centering said spectral reference window on said each pixel vector of said second spectral image;
   (ii) for each said pixel vector of said spectral reference window, computing an inner product of said each pixel vector of said spectral reference window and a corresponding said pixel vector of said second spectral image; and
   (iii) summing said inner products.

3. The method of claim 2, wherein said inner products are normalized.

4. The method of claim 2, wherein said hypercorrelating is effected by steps further including:
   (iv) dividing said sum of said inner products by a total number of said pixel vectors of said spectral reference window, thereby providing an average of said inner products.

5. The method of claim 2, wherein said hypercorrelating is effected by steps further including: for each said pixel vector of said second spectral image: prior to said computing of said inner products:
   (iv) shifting said pixel vectors of said spectral reference window by a first common offset vector; and
   (v) shifting said corresponding pixel vectors of said second spectral image by a second common offset vector.

6. The method of claim 5, wherein said first common offset vector is an average of said pixel vectors of said first spectral image, and wherein said second common offset vector is an average of said pixel vectors of said second spectral image.

7. The method of claim 5, wherein said first common offset vector is an average of a subset of said pixel vectors of said first spectral image, and wherein said second common offset vector is an average of a subset of said pixel vectors of said second spectral image.

8. A method of tracking a target, comprising the steps of:
(a) acquiring a first spectral image of a scene that includes the target;
(b) designating a spectral reference window in said first spectral image;
(c) acquiring a second spectral image of said scene;
(d) hypercorrelating said spectral reference window with said second spectral image, thereby obtaining a hypercorrelation function, a maximum of said hypercorrelation function then corresponding to a location of the target in said scene;
(e) acquiring a first panchromatic image of said scene;
(f) designating a panchromatic reference window in said first panchromatic image;
(g) acquiring a second panchromatic image of said scene;
(h) correlating said panchromatic reference window with said second panchromatic image, thereby obtaining a correlation function; and
(i) combining said hypercorrelation function with said correlation function to obtain a joint correlation function, a maximum of said joint correlation function then corresponding to a location of the target in said scene.

9. The method of claim 8, wherein said joint correlation function is a pixelwise minimum of said hypercorrelation function and said correlation function.

10. The method of claim 8, wherein said acquiring of said first panchromatic image is effected substantially simultaneously with said acquiring of said first spectral image, and wherein said acquiring of said second panchromatic image is effected substantially simultaneously with said acquiring of said second spectral image.

11. The method of claim 8, wherein said acquiring of said first panchromatic image is effected by stacking said first spectral image, and wherein said acquiring of said second panchromatic image is effected by stacking said second spectral image.

12. A method of tracking a target, comprising the steps of:
(a) acquiring a first spectral image of a scene that includes the target;
(b) designating a spectral reference window in said first spectral image;
(c) acquiring a second spectral image of said scene; and
(d) hypercorrelating said spectral reference window with said second spectral image, thereby obtaining a hypercorrelation function, a maximum of said hypercorrelation function then corresponding to a location of the target in said scene;
wherein each said spectral image includes:
(a) a first spectral band including only wavelengths below about 720 nanometers; and
(b) a second spectral band including only wavelengths above about 720 nanometers.

13. The method of claim 12, wherein said spectral images include only said first and second spectral bands.

14. The method of claim 12, wherein said first spectral band includes only wavelengths above about 605 nanometers, and wherein each said spectral image includes a third spectral band including only wavelengths below about 605 nanometers.

15. The method of claim 14, wherein said spectral images include only said first, second and third spectral bands.

16. A system for tracking a target, comprising:
(a) a spectral imager for acquiring first and second spectral images of a scene that includes the target;
(b) a mechanism for designating a spectral reference window, in said first spectral image, that includes a respective plurality of pixel vectors; and
(c) a processor for hypercorrelating said spectral reference window with said second spectral image, thereby obtaining a hypercorrelation function, a maximum whereof corresponds to a location of the target in said scene.

17. A system for tracking a target, comprising:
(a) a spectral imager for acquiring first and second spectral images of a scene that includes the target;
(b) a panchromatic imaging mechanism for acquiring first and second panchromatic images of said scene;
(c) a mechanism for designating a spectral reference window in said first spectral image;
(d) a mechanism for designating a panchromatic reference window in said first panchromatic image; and
(e) a processor for:
(i) hypercorrelating said spectral reference window with said second spectral image, thereby obtaining a hypercorrelation function,
(ii) correlating said panchromatic reference window with said second panchromatic image, thereby obtaining a correlation function, and
(iii) combining said hypercorrelation function with said correlation function to obtain a joint correlation function, a maximum whereof corresponds to a location of the target in said scene.

18. A system for tracking a target, comprising:
(a) a spectral imager for acquiring first and second spectral images of a scene that includes the target, each said spectral image including:
(i) a first spectral band including only wavelengths below about 720 nanometers, and
(ii) a second spectral band including only wavelengths above about 720 nanometers;
(b) a mechanism for designating a spectral reference window in said first spectral image; and
(c) a processor for hypercorrelating said spectral reference window with said second spectral image, thereby obtaining a hypercorrelation function, a maximum whereof corresponds to a location of the target in said scene.

* * * * *